(12) United States Patent
Li et al.

(10) Patent No.: US 7,710,991 B1
(45) Date of Patent: May 4, 2010

(54) SCALABLE PACKET ROUTING AND SWITCHING DEVICE AND METHOD

(75) Inventors: Anthony J. Li, San Mateo, CA (US); William L. Lynch, La Honda, CA (US); Peter M. Barnes, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 1094 days.

(21) Appl. No.: 10/414,135

(22) Filed: Apr. 14, 2003

Related U.S. Application Data

(63) Continuation-in-part of application No. 10/177,496, filed on Jun. 20, 2002, now Pat. No. 7,382,787.

(51) Int. Cl.
*H04L 12/28* (2006.01)

(52) U.S. Cl. .................. 370/414; 370/412; 370/217; 370/219; 370/221

(58) Field of Classification Search ................ 370/389, 370/392, 401, 412–415, 431, 432, 474–476, 370/217, 219, 221, 235–238, 390, 396, 395.1, 370/395.21, 395.31, 411
See application file for complete search history.

(56) References Cited

U.S. PATENT DOCUMENTS

| | | | |
|---|---|---|---|
| 4,885,744 A | 12/1989 | Lespagnol et al. | |
| 5,471,592 A | 11/1995 | Gove et al. | |
| 5,524,258 A | 6/1996 | Corby, Jr. et al. | |
| 5,734,649 A | 3/1998 | Carvey et al. | |
| 5,781,772 A | 7/1998 | Wilkinson, III et al. | |
| 5,802,278 A | 9/1998 | Isfeld et al. | |
| 5,838,894 A | 11/1998 | Horst | |
| 5,905,725 A | 5/1999 | Sindhu et al. | |
| 5,909,440 A | 6/1999 | Ferguson et al. | |
| 5,920,699 A * | 7/1999 | Bare ......................... | 709/225 |
| 5,923,643 A | 7/1999 | Higgins et al. | |
| 5,930,256 A | 7/1999 | Greene et al. | |
| 6,011,795 A | 1/2000 | Varghese et al. | |
| 6,018,524 A | 1/2000 | Turner et al. | |
| 6,078,963 A | 6/2000 | Civanlar et al. | |
| 6,091,725 A | 7/2000 | Cheriton et al. | |
| 6,101,192 A | 8/2000 | Wakeland | |

(Continued)

OTHER PUBLICATIONS

"Xelerated Packet Devices", *MicroDesign Resources Presentation, Network Processor Forum*, (Jun. 14, 2001), 11 pgs.

(Continued)

*Primary Examiner*—Pankaj Kumar
*Assistant Examiner*—Mark A Mais
(74) *Attorney, Agent, or Firm*—Schwegman, Lundberg & Woessner, P.A.

(57) ABSTRACT

Methods of routing and switching a packet from an incoming link to an outgoing link of a router. In one example, the method includes assigning a destination queue to the packet, determining if the router is implemented in a scaled-down configuration, remapping the destination queue to one or more remapped destination queues, and storing the packet in the one or more remapped destination queues. In one embodiment, the method may also include requesting a packet from the destination queue, translating the request to the remapped destination queue, and transmitting the packet from the remapped destination queue.

16 Claims, 25 Drawing Sheets

U.S. PATENT DOCUMENTS

| | | | |
|---|---|---|---|
| 6,161,139 A | 12/2000 | Win et al. | |
| 6,308,219 B1 | 10/2001 | Hughes | |
| 6,430,181 B1 | 8/2002 | Tuckey | |
| 6,453,413 B1 | 9/2002 | Chen et al. | |
| 6,526,055 B1 | 2/2003 | Perlman et al. | |
| 6,631,419 B1 | 10/2003 | Greene | |
| 6,658,002 B1 | 12/2003 | Ross et al. | |
| 6,675,187 B1 | 1/2004 | Greenberger | |
| 6,687,781 B2 | 2/2004 | Wynne et al. | |
| 6,721,316 B1 | 4/2004 | Epps et al. | |
| 6,731,633 B1* | 5/2004 | Sohor et al. | 370/392 |
| 6,732,203 B2 | 5/2004 | Kanapathippillai et al. | |
| 6,751,191 B1 | 6/2004 | Kanekar et al. | |
| 6,778,490 B1* | 8/2004 | Achilles et al. | 370/217 |
| 6,785,728 B1 | 8/2004 | Schneider et al. | |
| 6,795,886 B1 | 9/2004 | Nguyen | |
| 6,801,950 B1* | 10/2004 | O'Keeffe et al. | 709/238 |
| 6,804,815 B1 | 10/2004 | Kerr et al. | |
| 6,879,559 B1 | 4/2005 | Blackmon et al. | |
| 6,922,724 B1 | 7/2005 | Freeman et al. | |
| 6,941,487 B1* | 9/2005 | Balakrishnan et al. | 714/4 |
| 6,944,183 B1 | 9/2005 | Iyer et al. | |
| 6,944,860 B2 | 9/2005 | Schmidt | |
| 6,954,436 B1* | 10/2005 | Yip et al. | 370/254 |
| 6,961,783 B1 | 11/2005 | Cook et al. | |
| 6,965,615 B1 | 11/2005 | Kerr et al. | |
| 6,973,488 B1 | 12/2005 | Yavatkar et al. | |
| 6,990,527 B2 | 1/2006 | Spicer et al. | |
| 7,006,431 B1 | 2/2006 | Kanekar et al. | |
| 7,020,718 B2 | 3/2006 | Brawn et al. | |
| 7,028,098 B2 | 4/2006 | Mate et al. | |
| 7,043,494 B1 | 5/2006 | Joshi et al. | |
| 7,051,039 B1 | 5/2006 | Murthy et al. | |
| 7,051,078 B1 | 5/2006 | Cheriton | |
| 7,054,315 B2 | 5/2006 | Liao | |
| 7,054,944 B2 | 5/2006 | Tang et al. | |
| 7,069,372 B1 | 6/2006 | Leung, Jr. et al. | |
| 7,073,196 B1 | 7/2006 | Dowd et al. | |
| 7,095,713 B2* | 8/2006 | Willhite et al. | 370/219 |
| 7,103,708 B2 | 9/2006 | Eatherton et al. | |
| 7,111,071 B1 | 9/2006 | Hooper | |
| 7,124,203 B2 | 10/2006 | Joshi et al. | |
| 7,136,383 B1* | 11/2006 | Wilson | 370/392 |
| 7,139,238 B2* | 11/2006 | Hwang | 370/218 |
| 7,155,518 B2 | 12/2006 | Forslow | |
| 7,159,125 B2 | 1/2007 | Beadles et al. | |
| 7,184,440 B1 | 2/2007 | Sterne et al. | |
| 7,185,365 B2 | 2/2007 | Tang et al. | |
| 7,200,144 B2 | 4/2007 | Terrell et al. | |
| 7,200,865 B1 | 4/2007 | Roscoe et al. | |
| 7,203,171 B1 | 4/2007 | Wright | |
| 7,225,204 B2 | 5/2007 | Manley et al. | |
| 7,225,263 B1 | 5/2007 | Clymer et al. | |
| 7,227,842 B1 | 6/2007 | Ji et al. | |
| 7,230,912 B1 | 6/2007 | Ghosh et al. | |
| 7,231,661 B1 | 6/2007 | Villavicencio et al. | |
| 7,239,639 B2 | 7/2007 | Cox et al. | |
| 7,249,374 B1 | 7/2007 | Lear et al. | |
| 7,257,815 B2 | 8/2007 | Gbadegesin et al. | |
| 7,274,702 B2* | 9/2007 | Toutant et al. | 370/400 |
| 7,274,703 B2* | 9/2007 | Weyman et al. | 370/401 |
| 7,280,975 B1 | 10/2007 | Donner | |
| 7,302,701 B2 | 11/2007 | Henry | |
| 7,382,787 B1* | 6/2008 | Barnes et al. | 370/401 |
| 7,418,536 B2* | 8/2008 | Leung et al. | 710/306 |
| 7,450,438 B1* | 11/2008 | Hoist et al. | 365/189.07 |
| 7,525,904 B1 | 4/2009 | Li et al. | |
| 7,536,476 B1 | 5/2009 | Alleyne | |
| 2002/0035639 A1 | 3/2002 | Xu | |
| 2003/0108056 A1 | 6/2003 | Sindhu et al. | |
| 2003/0163589 A1 | 8/2003 | Bunce et al. | |
| 2004/0024888 A1 | 2/2004 | Davis et al. | |
| 2006/0117126 A1 | 6/2006 | Leung et al. | |
| 2006/0159034 A1 | 7/2006 | Talur et al. | |
| 2009/0063702 A1 | 3/2009 | Holst et al. | |

OTHER PUBLICATIONS

Belenkiy, A., "Deterministic IP Table Lookup at Wire Speed", *The Internet Global Summit (INET '99)*, http://www.isoc.org/inet99/proceedings/4j/4j_2.htm, (observed May 12, 2003), 18 pgs.

Cataldo, A., "Net Processor Startup Takes Pipelined Path to 40 Gbits/s", EETimes.com, Jul. 2, 2001 ,2 pgs.

Chiueh, T.-C., et al., "High-Performance IP Routing Table Lookup Using CPU Caching", *Proceedings. Eighteenth Annual Joint Conference of the IEEE Computer and Communication Societies (INFOCOM '99)*, vol. 3, (1999), 1421-1428.

Degermark, M., et al., "Small Forwarding Tables for Fast Routing Lookups", *Proceedings, ACM SIGCOMM '97*, (1997) 3-14.

Gupta, P., et al., "Routing Lookups in Hardware at Memory Access Speeds", *Proceedings, Seventeen Annual Joint Conference of the IEEE Computer and Communications Societies (INFOCOM '98)*, vol. 3, (1998), 1240-1247.

Kung, H. T., et al., "Algorithms for VLSI Processor Arrays", *In: Introduction to VLSI Systems*, Mead, C., et al., Editors, Addison-Wesley, Reading, MA, (1980), 271-292.

Lampson, B., et al., "IP Lookups Using Multiway and Multicolumn Search", *IEEE/ACM Transactions on Networking*, 7(3), (Jun. 1999), 324-334.

Lindberg, K., "Multi-Gigabit Routers", *Proceedings, HUT Internetworking Seminar*, http://www.tml.hut.fi/Opinnot/Tik-110.551/1998/papers/02MultiGigabitRouter/paper.html, (onserved May 12, 1998), 14 pgs.

Mcauley, A. J., et al., "Fast Routing Table Lookup Using CAMs", *Proceedings, Twelfth Annual Joint Conference of the IEEE Computer and Communications Societies, Networking: Foundation for the Future (INFOCOM '93)*, vol. 3, (1993), 1382-1391.

Partridge, C., et al., "A 50-Gb/s IP Router", *IEEE/ACM Transactions on Networking*, 6(3), (Jun. 1998), 237-248.

Waldvogel, M., et al., "Scalable High Speed IP Routing Lookups", *Proceeding, ACM SIGCOMM '97*, (1997), 25-36.

"What's Inside a Router?", http://www-net.cs.umass.edu/kurose/network/inside/inside.htm, (observed Aug. 29, 2005), 11 pgs.

Gupta, P., et al., "Classifying Packets With Hierarchical Intelligent Cuttings", *IEEE Micro*, 21(1) (Jan./Feb. 2000), 34-41.

Gupta, P., et al., "Packet Classification on Multiple Fields", *Proceedings of the Conference on Applications, Technologies, Architectures, and Protocols for Computer Communication (ACM SIGCOMM '99)*, 147-160.

Lakshman, T. V., et al., "High-Speed Policy-Based Packet Forwarding Using Efficient Multi-Dimensional Range Matching", *Proceedings of the Conference on Applications, Technologies, Architectures, and Protocols for Computer Communications (ACM SIGCOMM '98)*, (1998), 203-214.

Qui, L., et al., "Fast Firewall Implementations for Software and Hardware-Based Routers", *Microsoft Technical Report MSR-TR-2001-61*, (Jun. 2001), 18 pgs.

Srinivasan, V., et al., "Fast and Scalable Layer Four Switching", *Proceedings of the Conference on Applications, Technologies, Architectures, and Protocols for Computer Communications (ACM SIGCOMM '98)*, (1998), 191-202.

Srinivasan, V., et al., "Packet Classification Using Tuple Space Search", *Proceedings of the Conference on Applications, Technologies, Architectures, and Protocols (ACM SIGCOMM '99)*, (1999), 135-146.

"U.S. Appl. No. 10/177,496, Notice of Allowance mailed Jul. 17, 2007", 6 p.

"U.S. Appl. No. 10/177,496, Preliminary Amendment filed Jun. 12, 2007", 10 p.

"U.S. Appl. No. 10/177,496, Response filed May 15, 2007 to Final Office Action mailed Feb. 15, 2007", 11 p.

"U.S. Appl. No. 10/177,496 Final Office Action mailed Feb. 15, 2007", 14 p.

"U.S. Appl. No. 10/177,496 Non Final Office Action mailed Aug. 1, 2006", 21 p.

"U.S. Appl. No. 10/177,496 Response filed Nov. 30, 2006 to Non Final Office Action mailed Aug. 1, 2006", 14 p.

"U.S. Appl. No. 10/407,528 Non-Final Office Action mailed Jun. 29, 2007", 20 p.

"U.S. Appl. No. 10/414,133, Final Office Action mailed Aug. 8, 2007", 13 p.

"U.S. Appl. No. 10/414,133, Non-Final Office Action mailed Feb. 23, 2007", 11 p.

"U.S. Appl. No. 10/414,133, Response filed May 22, 2007 to Non-Final Office Action mailed Feb. 23, 2007", 9 p.

"U.S. Appl. No. 10/414,135, Response filed Jun. 6, 2007 to Non-Final Office Action mailed Mar. 8, 2007", 10 p.

"U.S. Appl. No. 10/418,634, Non-Final Office Action mailed Sep. 14, 2007", 21 p.

"U.S. Appl. No. 10/745,067 Non-Final Office Action mailed Jul. 2, 2007", 11 p.

Ballardie, A., "Core Based Trees (CBT) Multicast Routing Architecture", *RFC 2201*, (Sep. 1997),1-15.

Finseth, C., "An Access Control Protocol, Sometimes Called TACACS", *RFC 1492*, (Jul. 1993),1-21.

Kille, S., "Representing the O/R Address Heirarchy in the X.500 Directory Information Tree", *RFC 2294*, (Mar. 1998),1-13.

Myers, J., "IMAP4 ACL Extension", *RFC 2086*, (Jan. 1997), 1-8.

Stokes, E. , et al., "Access Control Requirements for LDAP", *RFC 2820*, (May 2000),1-9.

Wijnen, B. , et al., "View-Based Access Control Model (VACM) for the Simple Network Management Protocol (SNMP)", *RFC 2575*, (Apr. 1999),1-38.

"U.S. Appl. No. 11/318,217, Non-Final Office Action mailed Sep. 30, 2009", 19 Pgs.

* cited by examiner

SCALABLE PACKET ROUTING AND SWITCHING DEVICE AND METHOD

CROSS-REFERENCE TO RELATED APPLICATION

This application is a continuation-in-part of the commonly assigned patent application entitled "PACKET ROUTING AND SWITCHING DEVICE," filed on Jun. 20, 2002, application Ser. No. 10/177,496, now U.S. Pat. No. 7,382,787, issued on Jun. 3, 2008, the disclosure of which is hereby incorporated by reference in its entirety.

FIELD OF THE INVENTION

This invention relates, in general, to network routers, and more particularly to a scalable device and method for performing routing and switching in a packet-switched computer network.

BACKGROUND OF THE INVENTION

Computer networks often use packet-switching for transmitting messages, such as web pages and e-mail, along a path between a source and a destination on the network. An example of the basic topology of a packet-switched network 20 is illustrated in FIG. 1, and the Internet is one example of a packet-switched network.

In a packet-switched network, messages to be transmitted are first divided into smaller discrete packets, which when transmitted may take different paths from a source 22 to a destination 24. When all of the packets arrive at the destination they are recompiled into the original message. The arrangement of the communication links or "hops" between the various devices 26 of the packet-switched network is a partially connected mesh topology where many of the devices are not directly connected to the other devices. Therefore, transmitting messages over a packet-switched network requires a device at the intersection of the links to guide packets from one link to another link along the packet's path.

Guiding packets along the path from the source to the destination includes routing and switching functions. Routing involves the examination of the packet to determine, among other things, the address of the next device in the network to send the packet to, i.e., determining the outgoing link for the packet. Switching involves actually directing packets to the outgoing link that corresponds to the next device in the network, i.e., switching the packet from the incoming link to the outgoing link.

In a packet-switched network, a router performs both routing and switching. Having multiple ports coupled with different links in the network, the router receives packets from an incoming link, examines a header of the packet to determine the outgoing link for the packet, and then transmits the packet on the outgoing link. The packet includes a portion of the message to be transmitted, and a header that includes destination information for the packet. In particular, routers make routing decisions based on an Internet Protocol (IP) destination address contained within the header. Generally, in a "lookup" operation, the router compares the IP destination address to a number of potential paths stored in a forwarding table, and then assigns the outgoing link to the packet. The header may also contain quality of service (QoS) data, which designates the priority with which the packet should be serviced by the router.

The IP destination address (or Layer 3 destination address) is a 32-bit identifier assigned to a device on a TCP/IP packet-switched network. The 32-bit IP address is subdivided into four numbers between 0 and 255 separated by periods, e.g., 10.230.15.255. The subdivisions of the IP address are hierarchical, representing from left to right greater specificity as to the destination for the packet. For example, the left most "10" portion of the exemplary address may represent the East Coast, the "230" portion may represent New York City, the "15" portion may represent a local area network ("LAN") in the Empire State Building, and "255" may represent the intended final destination in the LAN for the packet. To properly route a packet, a router need only have an output port associated with a portion of the IP destination address, such as one of the subdivision. For example, the router might transmit all packets having an IP destination address beginning with "10" on the outgoing link attached with a second router on the East Coast, which will then determine where to send the packet to next. Accordingly, a packet may make several hops along its path from the source to the destination.

The IP addressing scheme of a packet-switched network provides for scalability of the network, in that each router need not be directly connected with the destination for the packet. To manage scalability, the addition or removal of devices from the network is tracked and updated by the routing or forwarding table, which is typically dynamic. Routing protocol software provides communication between routers on the network and updates the forwarding table in each router to reflect changes in the topology of the network.

Conventional routers can suffer from a "denial of service attack" wherein the route processor of a conventional router is interrupted each time a route processor destined packet is received by the router. If a hacker generates a large number of route processor destined packets to a particular router, then that router may experience performance problems, and possibly shut down, if the route processor is continually interrupted so that it can deal with the receipt and processing of the route processor destined the packets.

Packets come in many different sizes ranging from 20 bytes to thousands of bytes, and are generally transmitted into a router at a line rate of, for example, 40 gigabits per second (Gbps). It may be problematic for conventional routers to perform the required routing table lookup operations for a series of smaller sized packets flowing into the conventional router at the 40 Gbps line rate without having to drop packets. If a packet is dropped, then the packet must be retransmitted, which slows the overall message transmission time. To avoid dropping packets, conventional routers frequently are "input-striped" in that as they receive packets from the network, the packets are divided into a number of fixed length units referred to as "cells," and the cells are written to a large buffer memory sequentially before performing the forwarding table lookup operations and determining the outgoing link for the packet. Such an input-striping process makes the initial front end writing process into the buffer memory rather simple, however, it is often difficult to read out the cells and reassemble the cells into a packet because packets are processed out of order in general within the router, which adds latency to the transmission of the packet.

In conventional routers, the input buffer memory required to store the incoming packets while the lookup is performed must be large to avoid overflowing the input buffer memory. Moreover, an additional large switching memory is generally required to store the packets for a period of time after the lookup operations are performed, but before the packet is transmitted to the correct outgoing link of the router. Accordingly, in order to avoid duplication of large high-speed memories, prior art devices oftentimes use a single memory for both the input buffering and the switching memory.

Oftentimes input-striping involves storing the cells non-contiguously in whatever portions of the single memory are available. The cells then stay in the single memory while the lookup is performed and the QoS priority for the packet is determined. As a consequence, the storage of the cells in the single memory is not a function of the outgoing link for the packet or the QoS priority for the packet because the outgoing link and the priority are unknown at the time the packet is cellified and stored. As an additional consequence, when the conventional router is ready to transmit the packet, the cells of the packet must be located in the single memory and then extracted. This generally requires a significant memory management scheme including, for example, memory pointers, link lists, and link list arrays to find and extract the cells from the single memory.

As recognized by the present inventors, what is needed is a packet routing and switching device, such as a router, which provides lookup processing of any size packet at the incoming link line rate while reducing the risk that packets are dropped. As recognized by the present inventors, the router may also be scalable to provide differing levels of functionality. It is against this background that various embodiments of the present invention were developed.

SUMMARY OF THE INVENTION

In light of the above and according to one broad aspect of one embodiment of the invention, disclosed herein is a method for storing a packet in a memory of a router. In one embodiment, the packet is assigned to at least one outgoing link of the router based on a destination address of the packet, and a determination is made whether the router is in a scaled-down configuration, and the packet is stored in the memory based in part on the determining and assigning operations.

The assigning operation may include assigning a destination queue to the packet that is mapped to the assigned outgoing link. Further, the determining operation may include determining a number of memory control units in the router, and may include assigning a queue offset number. The storing operation may write the packet in the destination queue and in at least one additional destination queue as a function of the queue offset number.

The storing operation may also include dividing the packet into at least two cells and writing the at least two cells in the destination queue, and in one example, the at least two cells are less than or equal to 34 bytes. The storing operation may also write the at least two cells in the at least one additional destination queue. Preferably, the storing operation writes the at least two cells in the destination queue contiguously in round robin order.

According to another broad aspect of another embodiment of the invention, disclosed herein is a method of routing and switching a packet from an incoming link to an outgoing link of a router. In one example, the method includes assigning a destination queue to the packet, determining if the router is implemented in a scaled-down configuration, remapping the destination queue to one or more remapped destination queues, and storing the packet in the one or more remapped destination queues. In one embodiment, the method may also include requesting a packet from the destination queue, translating the request to the one or more remapped destination queues, and transmitting the packet from the one or more remapped destination queues.

The features, utilities and advantages of various embodiments of the invention will be apparent from the following more particular description of embodiments of the invention as illustrated in the accompanying drawings.

DETAILED DESCRIPTION OF EMBODIMENTS OF THE INVENTION

This detailed description of embodiments of the present invention is subdivided into three sections: section I ("Introduction"); section II ("Method for Routing and Switching a Packet"); and, section III ("Redundancy and Scalability"). The introduction provides a description of components of a router and a description of an architecture for a router according to various embodiments.

The second section provides a detailed description of one method of routing and switching a packet. The description of the method includes a discussion of the flow of a packet through the router and various operations performed by the router as the packet flows through the router. These operations may be performed in a full-scale router and in various redundant and scaled-down routers discussed in detail in section III. Unlike conventional routers, one example of the method of routing and switching disclosed herein includes an operation of performing the forwarding table lookup operation before the packet is cellified and stored for switching. Accordingly, the outgoing link for the packet is determined before the packet is cellified, which is advantageous because the cells may then be stored in the switching memory as a function of the outgoing link, thereby making retrieval of the cells from memory efficient and fast.

The third section provides a discussion of the redundancy and scalability in various embodiments of a router. One advantage of redundancy is that it permits a router to operate at or near its standard operating characteristics despite some components being off-line due to a failure, an upgrade, or other reasons. One advantage of scalability is that it allows the same components of a router to be used in a variety of different configurations and to provide different levels of reliability and performance. Another advantage of scalability is that it allows a customer to change the performance of the router to suit their needs.

I. Introduction

Figure 1:
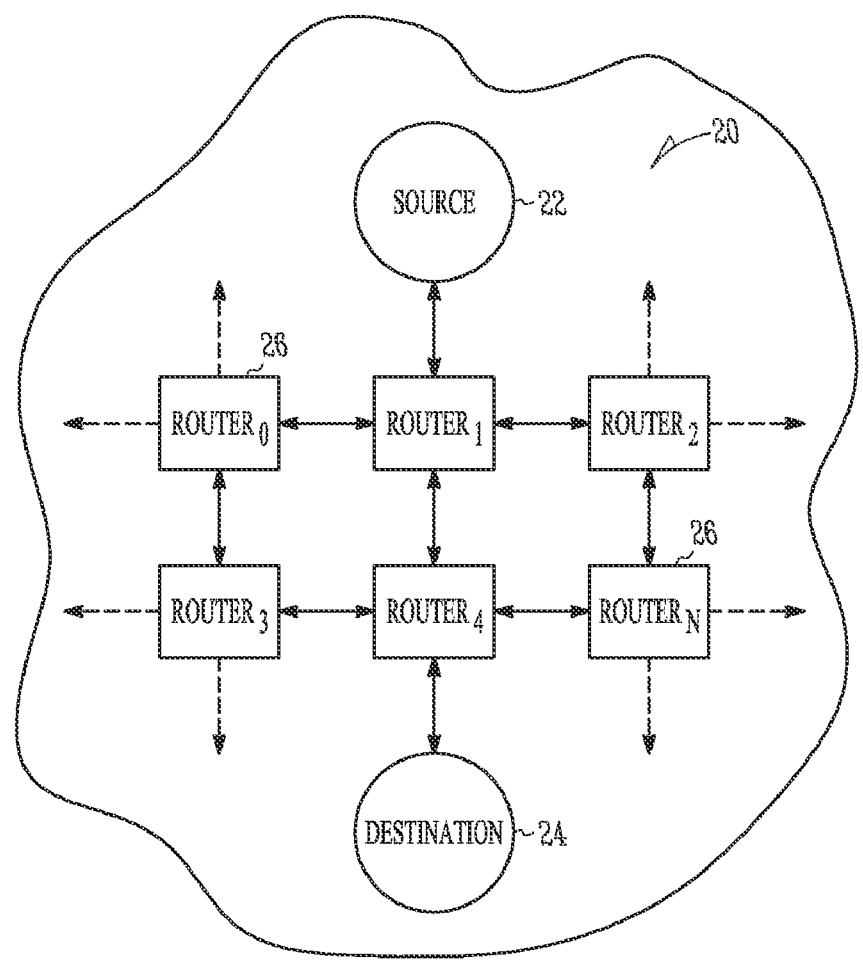
FIG. 1 illustrates one example of the basic topology of a packet-switched network, such as the Internet, having a source, a destination, and a plurality of routers therebetween.
Figure 2:
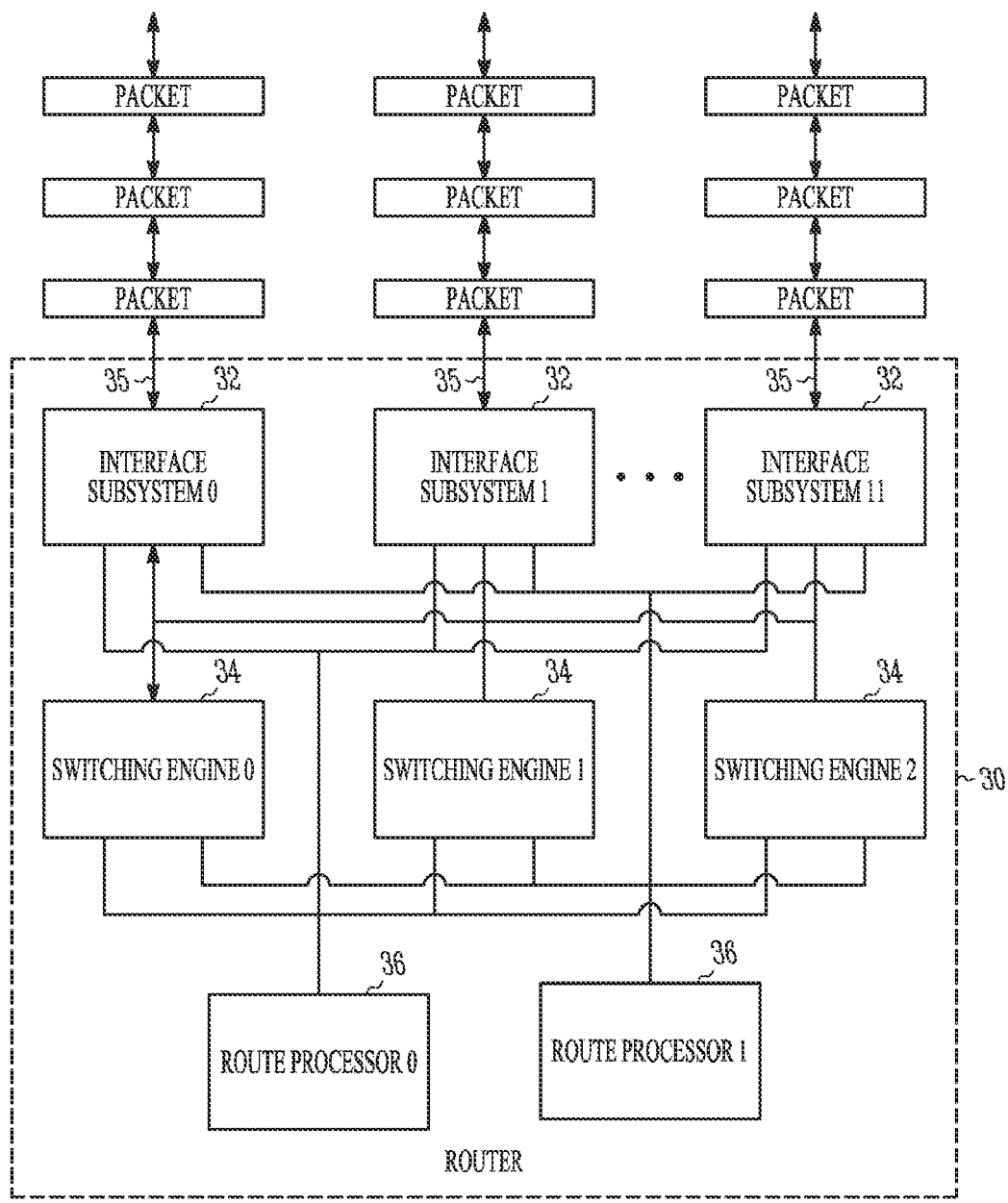
FIG. 2 illustrates a block diagram of a router, in accordance with one embodiment of the present invention.

FIG. 2 illustrates a high-level block diagram of a packet routing and switching device, or router 30, according to one example of the present invention for passing packet-switched data from an incoming link to an outgoing link. In one example, a router 30 includes at least one interface subsystem 32, at least one switching engine 34, and at least one route processor 36, the functionality of each is described in detail below. In one example, a full-scale router includes 12 interface subsystems, three switching engines, and two route processors. A "router" may include full-scale configurations, or may be implemented as scaled down or "cut-down" embodiments of the packet routing and switching device.

The interface subsystem 32 provides an interface between the router 30 and the network in which the router is connected. As mentioned above, a router has an input-side and an output-side. On the input-side of a router, each interface subsystem performs various operations on the packets including receiving packets from the incoming link of the network and determining the outgoing link to transmit the packet. On the output-side of the router, each interface subsystem performs additional operations including receiving cells from the switching engines, reassembling the packets, and transmitting packets to the outgoing link, in one embodiment.

The interface subsystem 32 includes a plurality of bi-directional ports 35 that are connected with the links in the network. Being bi-directional, the ports both receive packets from the links and transmit packets to the links. After a packet is received, the interface subsystem 32 determines routing information for the packet including the destination or outgoing link for the packet. One advantage of an embodiment of the present invention is that the operations to determine routing information for a packet are performed at the incoming link line rate, such as 40 Gbps. Accordingly, the packet may be cellified, and the cells stored sequentially in memory as a function of the routing information for the packet this process is referred to as "output-striping." Therefore, input-striping may be avoided, i.e., packets need not be divided into cells and stored in memory before the routing information for the packet is determined, as with conventional routers. In one embodiment, a plurality of destination queues are implemented in a switching memory, wherein each destination queue is mapped to an outgoing link. When a new packet is received by the router, it is assigned to a destination queue corresponding to the outgoing link for the packet, and then the packet is stored in the destination queue in FIFO order. The packet is transmitted to the outgoing link when it reaches the front of the queue after the other packets before it in the queue are transmitted.

In one embodiment, each interface subsystem 32 is connected with two of the three switching engines 34 in a full-scale router, which provides redundancy so that the router will function if one of the switching engines 34 is off-line.

In one embodiment, a switching engine 34 receives a packet from one of the interface subsystems 32, cellifies the packet, and temporarily stores the cells in a destination queue associated with the outgoing link for the packet. The cells are output-striped in that the cells are stored, in one embodiment contiguously, in memory as a function of the output for the packet. The cells are stored in the destination queue until the interface subsystem 32 associated with the outgoing link for the packet requests the packet for transmission, at which time the switching engine transmits the cells to the interface subsystem 32. The packet is then reassembled and transmitted along the port connected with the outgoing link for the packet.

Output-striping is advantageous because, in one embodiment, in order to extract all cells from memory of the switching engine, the interface subsystem 32 simply needs to know the location of the first cell of the packet in the destination queue, and the number of cells in the packet. In one example, the cells are stored contiguously in memory and the interface subsystem 32 sends requests in round robin order to each memory device associated with the cells. In contrast, as previously discussed, prior art devices utilize input-striping, cellifying the packet and storing the cells arbitrarily in memory before performing the lookup operations. Accordingly, prior art devices implement complicated extraction operations to extract cells from memory, which can reduce the overall throughput of the router.

The route processor (RP) 36 shown in FIG. 2 performs several overall management and configuration tasks for the router including running routing protocols that configure a forwarding table that the interface subsystems use to determine the outgoing link for the packet. In one version of a full-scale embodiment, a router 30 includes two route processors 36, which provide redundancy to the router 30 in the event that one of the RP's fail. The route processors 36 are connected with the switching engines 34 and the interface subsystems 32 via a control plane interface (CPI).

Figure 3A:
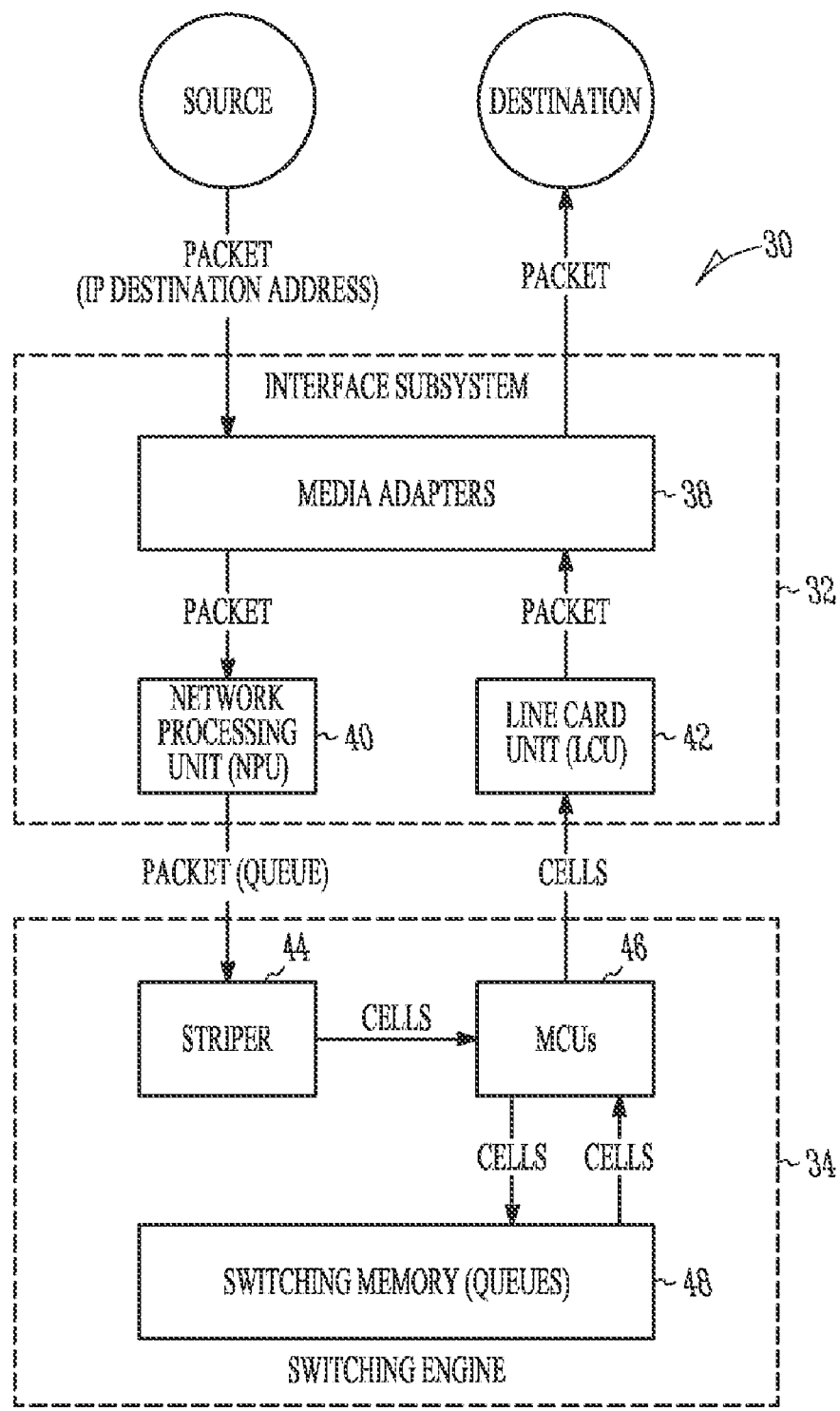
FIG. 3A illustrates a block diagram of a router including an interface subsystem and a switching engine, in accordance with one embodiment of the present invention.
Figure 3B:
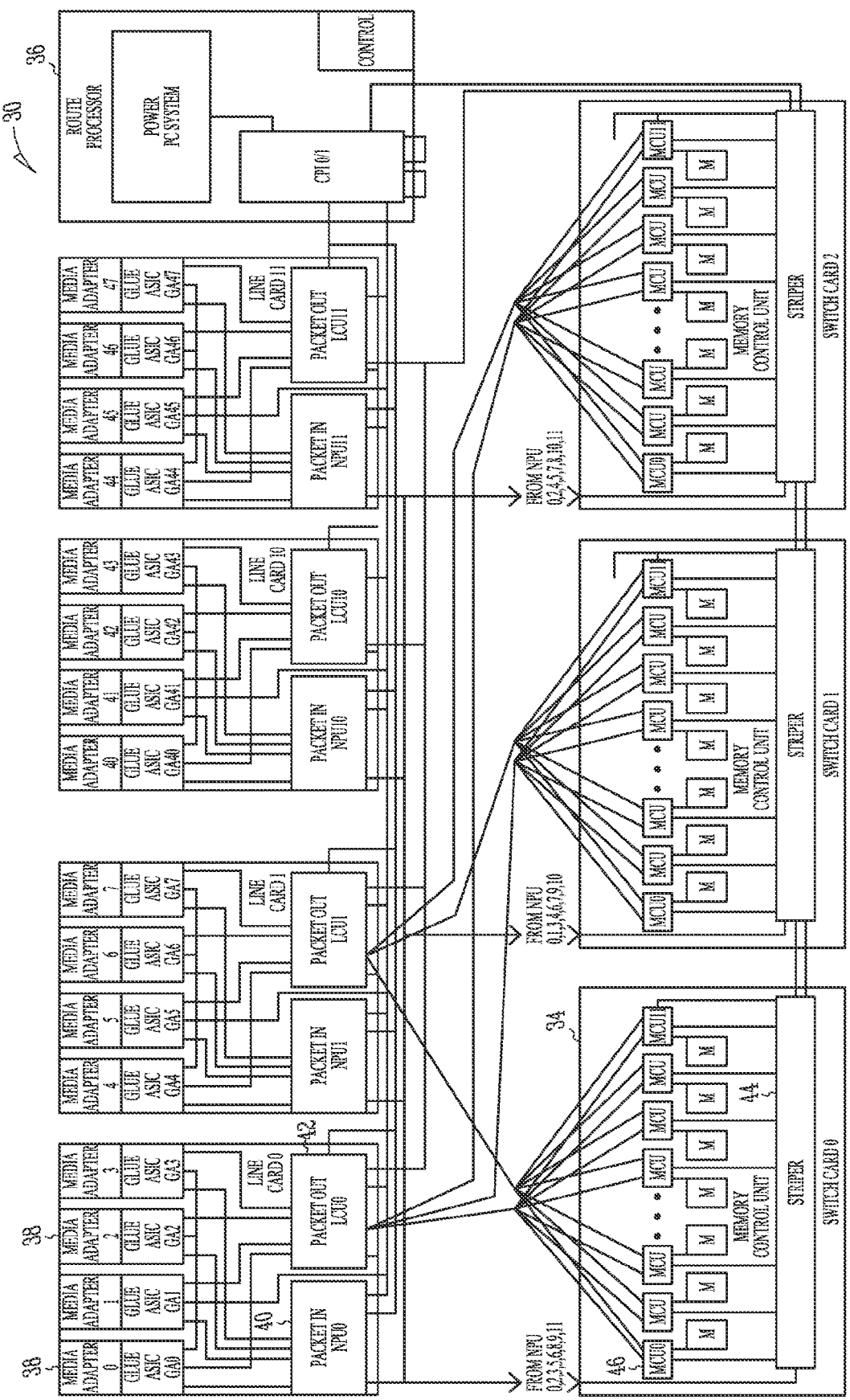
FIG. 3B illustrates a block diagram of a full-scale router including a plurality of interface subsystems and a plurality of switching engines, in accordance with one embodiment of the present invention.

Referring now to FIG. 3A, a block diagram of a router 30 is shown, according to one embodiment, illustrating a packet flow from the input-side of the interface subsystem 32, to the switching engine 34, and to the output-side of interface subsystem. Referring also to FIG. 3B, a block diagram of a full-scale router 30 is shown, in accordance with one embodiment of the present invention. The input-side of the interface subsystem includes a media adapter (MA) 38 connected with the incoming link for receiving packets from the incoming link and performing formatting operations on the packet. The input-side interface subsystem also includes a forwarding engine or network processing unit (NPU) 40 for receiving packets from the MA 38, and then analyzing the packet header and assigning a destination queue to the packet based on the packet header information. The destination queues are each associated with an outgoing link and are described in more detail below. The NPU 40 is connected with the switching engine 34 and transmits packets along with associated destination queue information thereto, in one embodiment.

On the output-side, the interface subsystem 32 also includes an output processing unit or line card unit (LCU) 42 that is connected with the output-side of the switching engine 34 for receiving cells therefrom.

The switching engine 34 is connected between the input-side and the output-side of the interface subsystems 32. In particular, the input-side of the switching engine is connected with the NPU, and the output-side of the switching engine is connected with the LCU. On the input-side, the switching engine 34 includes a cellification engine or striper 44 that receives a packet from the NPU 40 and divides the packet into one or more cells. In one embodiment, the striper 44 is connected with at least one memory control unit (MCU) 46 for managing at least one destination queue, where the cellified packet is stored. The destination queues are physically implemented in a series of high-speed memory units 48 connected with the MCUs. On the output-side, the MCUs are connected with the LCU.

Generally, when an outgoing link associated with a destination queue is available, the LCU 42 issues a request to the switching engine 34 for the next packet in the associated destination queue. After receiving the cells of the requested packet, the LCU 42, amongst other operations, reassembles the packet, and transmits the reassembled packet to the media adapter 38 associated with the outgoing link for the packet.

II. Method for Routing and Switching a Packet

Figure 4:
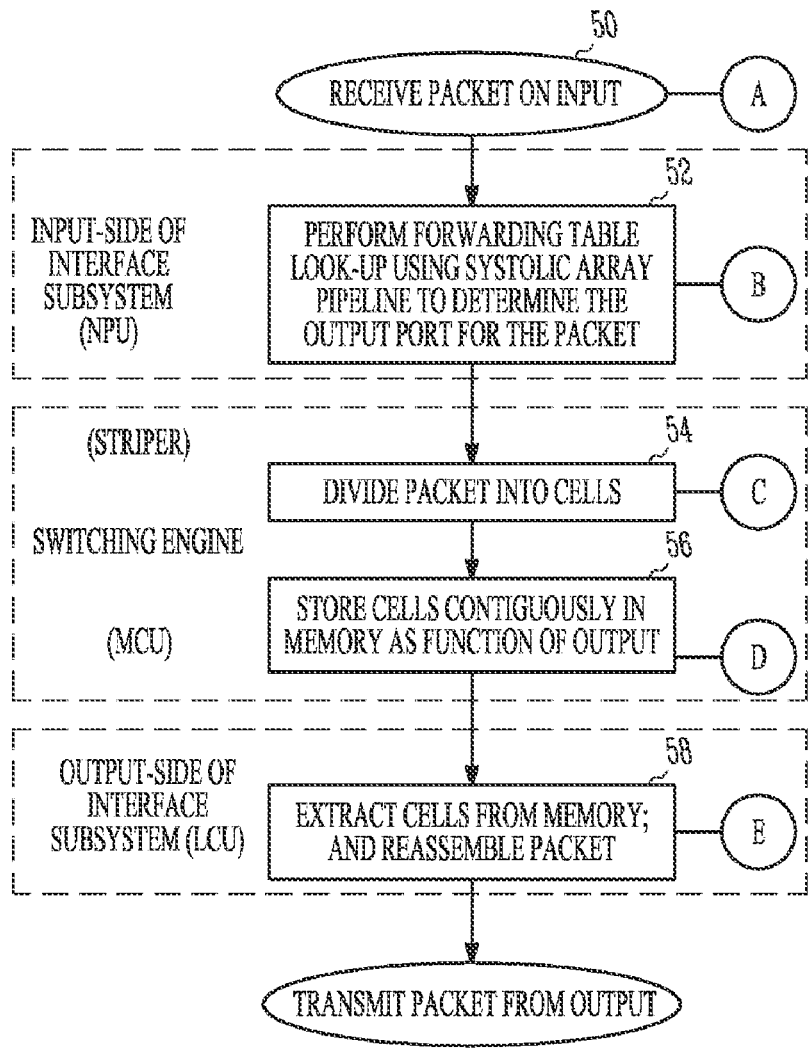
FIG. 4 illustrates a flowchart of the operations included in routing and switching a packet, in accordance with one embodiment of the present invention.

In accordance with one embodiment of the present invention, FIG. 4 illustrates one example of the operations of routing and switching a unicast packet from the time that the packet is received by the router until the time the packet is transmitted by the router. The router may support routing and switching of both unicast and multicast packets. A unicast packet is generally considered a packet with a single destination, whereas a multicast packet is generally considered a packet with multiple destinations. FIG. 4 references the primary components of the interface subsystems and the switching engines shown in FIGS. 2, 3, and others, showing the processes that occur as a packet flows through the router, in one embodiment.

Referring to FIG. 4, in operation 50, a packet is received by the input-side of the interface subsystem from an incoming link coupled with the network. In operation 52 the packet's destination port is determined. In one embodiment, the NPU performs routing operations including a forwarding table lookup operation based on the packet header, so that an output port can be assigned to the packet. The NPU may include a systolic array pipeline, which is discussed in more detail below, to perform the forwarding table lookup and other operations. The NPU completes the lookup process and a destination port or output queue of the router is assigned to the packet—before the packet is cellified or striped to memory, in one example of the invention.

In operation 54, the packet is divided into cells. In one embodiment, the NPU transmits the packet to the switching engine where the packet is divided into cells. In operation 56, the cells are output-striped into the switching memory, i.e., the cells are stored contiguously in memory as function of the output interface previously assigned based on the packet's destination address.

In operation 58, the cells are removed from the memory, and are reassembled for transmission along the proper outgoing link. In one embodiment, the LCU requests the cells from the switching engine, and reassembles the packet after the cells have been received. The output-striping of the cells by the striper is advantageous because the cell locations are always known, and to request cells, only the location of the first cell is required because all remaining cells are stored contiguously. In operation 499, after the packet is reassembled, it is transmitted from the LCU to the appropriate outgoing link.

Figure 5A:
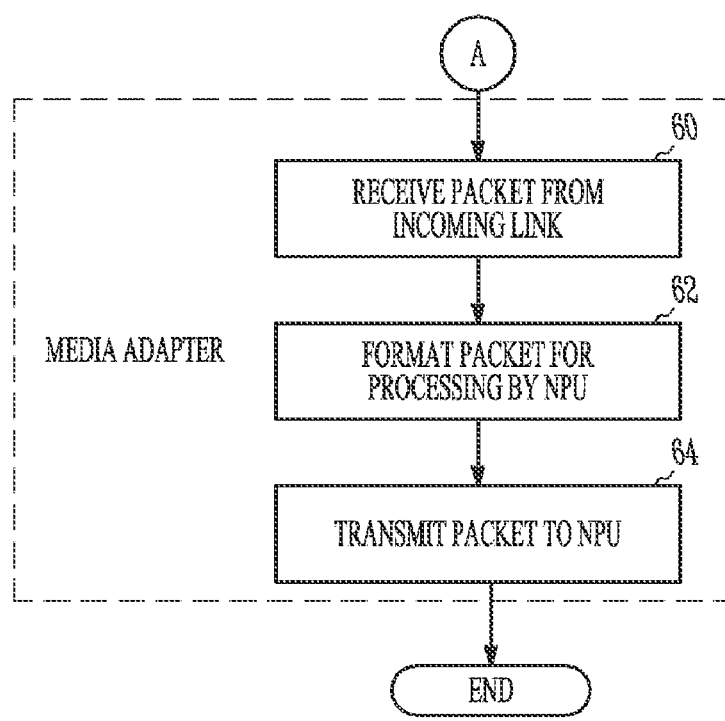
FIG. 5A illustrates a flowchart of an example of the operations for receiving a packet in a router, in accordance with one embodiment of the present invention.

FIGS. 5A-5E illustrate operations associated with each primary operation shown in FIG. 4. FIG. 5A illustrates the operations for receiving a packet, which are performed by the MA in one embodiment. In operation 60, the MA receives a packet on a port connected with an incoming link. As discussed herein, the term "incoming link" is used to conceptually refer to a link on which packets are streaming into the router, and the term "outgoing link" is used to conceptually refer to a link on which packets are streaming out of the router. The links, like the ports, however, may be bi-directional and accordingly, messages may be both flowing into and out of the router on the links. In operation 62, the MA formats the packet for processing by the NPU. Generally, formatting includes adding information to the header and removing information from the header to facilitate subsequent operations performed by the router.

In operation 64, the MA transmits the packets to the NPU. In one example, the MA transmits packets to the NPU in fragments, as they are received. The last fragment of any given packet is marked to indicate the end of the packet. After all of the fragments of the packet have been transmitted to the NPU, the MA can send a signal to the NPU that the transmission of the packet is complete.

Figure 5B:
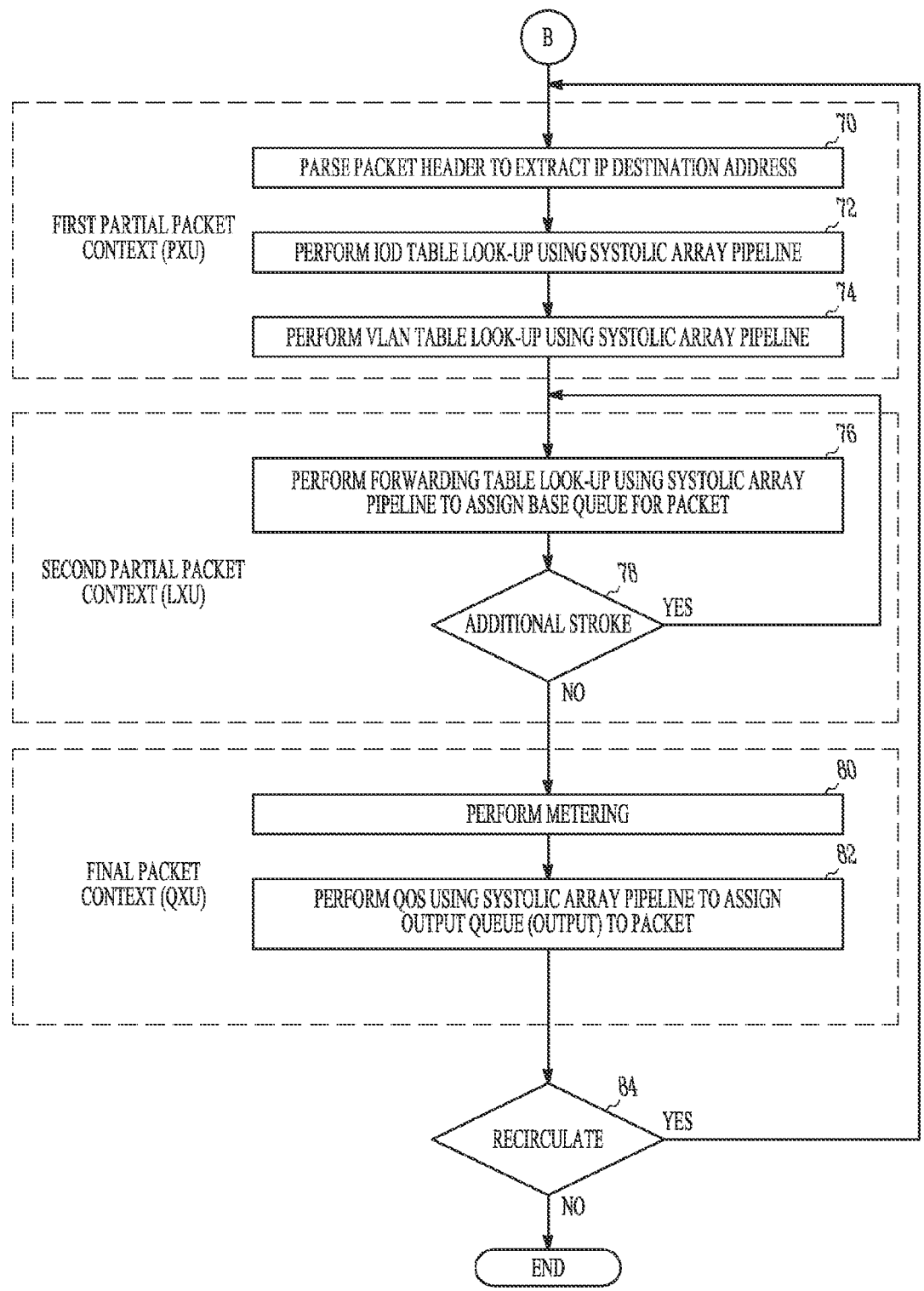
FIG. 5B illustrates a flowchart of an example of the operations for performing a forwarding table lookup to determine an output for the packet, in accordance with one embodiment of the present invention.

FIG. 5B illustrates examples of the routing operations including performing a forwarding table lookup. The lookup operation may use, in one example, a systolic array for assigning an output to the packet. These operations are performed by the NPU in one embodiment. Other forwarding engines may be used to the extent that they can process packets at line rate. After receiving a packet from the MA, in operation 70, the NPU parses the packet header to extract the IP destination address and other information, which are used to create a first partial packet context. As will be described below, a packet context generally includes information from the packet header—such as the IP destination address and the QoS data—but does not include the body or payload of the packet.

In one example, parsing the header is performed because the header may contain variable length information such as the link layer portion of the header (e.g., VLAN encapsulation on Ethernet).

In operation 72, the NPU performs an interface ordinal descriptor ("IOD") table lookup and assigns an IOD number to the packet. The IOD number describes the input port that the packet was received on, which is useful, for example, to meter the input ports. In one example, the IOD table lookup is performed using a systolic array pipeline. In operation 74, the NPU performs a virtual local area network ("VLAN") table lookup and determines if the packet is destined for a VLAN. In one example, the VLAN table lookup is performed using a systolic array pipeline. Parsing operations 70-74 can be used to form a first partial packet context including the IP destination address for the packet, IOD information, and VLAN information. Conceptually, a "partial packet context" may include incomplete or in process packet context, and a "packet context" may include a partial packet context or a complete packet context, which contains the complete routing and switching information for the packet along with other information.

Following the parsing operations, the packet context (i.e., the first partial packet context), and the IP destination address of the packet context used in a lookup operation, which may be used to form a second partial packet context. In operation 76, the NPU looks-up the IP destination address in the forwarding table to assign a base destination queue to the packet. Each destination queue is mapped to an outgoing link. In one embodiment, the lookup operation is performed using a systolic array pipeline, by doing a trie search of tries stored in the forwarding table. Because the NPU is able to execute forwarding table lookup operations at the line rate for any size packet, it is able to assign a destination queue to the packet before the packet is cellified and stored in memory.

In operation 78, it is determined whether an additional stroke of the lookup pipeline is required. Depending on the IP destination address and the set-up of the systolic array pipeline, the first partial packet context may have to pass through the pipeline more than once to determine the base destination queue for the packet, which is referred to as "stroking" and is discussed in more detail below. If an additional stroke is not necessary, then the base destination queue information is added to the first packet context thereby generating the second partial packet context.

After the forwarding table lookup operations, the packet context (i.e., the second partial packet context) is processed by the queuing operations to complete the packet context generation. In operation 80, the NPU may perform metering, which is the monitoring and potential attenuation of packet traffic on a particular input port. Metering is used to provide customers with different levels of service. In one example, the NPU may also perform policing, which is the act of enforcing a certain policy for a group of packets having similar characteristics based on, for example, the results of metering, the packet's source address, destination address, source port, and destination port. In one example, an array of meters can be used for policing. alternatively, the LCU may perform policing. In operation 82, the NPU, taking into account the QoS for the packet, assigns the destination queue to the packet. In one embodiment, QoS is performed using a systolic array pipeline, which accesses a queue-offset number in a QoS table, and thereby modifies the base destination queue number to arrive at the destination queue for the packet. As described in more detail below, each outgoing link has multiple destination queues mapped to it, but the queues may have associated therewith.

In one embodiment, the router may support 3072 unicast queues per LCU, and 36,864 total queues for the full-scale router having 12 LCUs. Each destination queue corresponds to a port of the router (i.e., an output port connected with an outgoing link), and corresponds to a priority that the packet will be serviced at. Multiple queues may designate the same port, but with varying priorities. Accordingly, as discussed above with regard to operation 428, the base destination queue is assigned to the packet. In operation 82, depending on QoS information, the base destination queue may be offset, which will designate the same port, but with a different priority.

In operation 84, it is determined whether the packet will be recirculated. Some packets, such as tunneled packets, may require recirculation through the NPU to complete the generation of the packet context.

As shown in FIG. 3B, the switching engine 34 includes the striper 44, which is connected, in a full-scale embodiment, with a plurality of MCUs 46. After completion of the packet context, the packet and its context are transmitted by the NPU 40 to the switching engine 34.

Figure 5C:
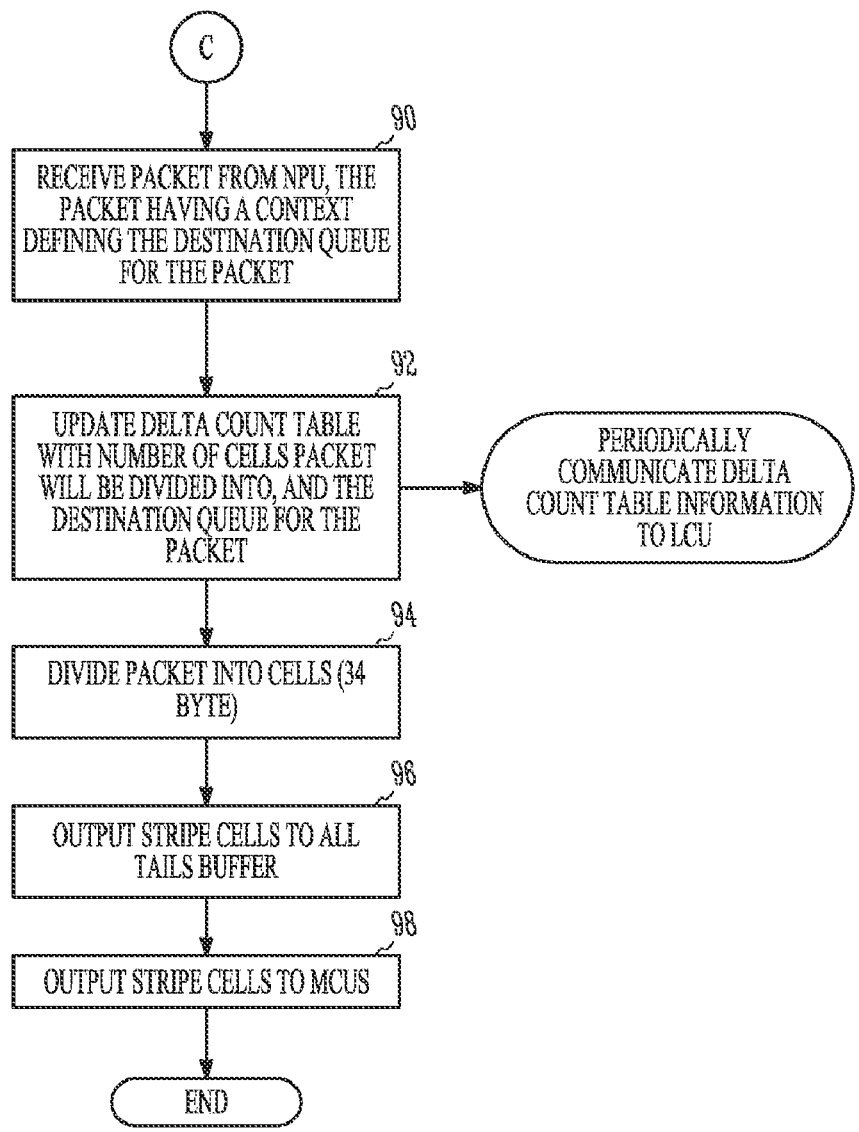
FIG. 5C illustrates a flowchart of an example of the operations for dividing a packet into cells, in accordance with one embodiment of the present invention.

Referring now to FIG. 5C, in operation 90, the striper receives the packet and its context from the NPU. In operation 92, when the striper receives a packet, a delta count table is updated with information regarding the number of cells to be stored in a destination queue. The delta count table information is periodically communicated to the LCU so that the LCU can track the number of cells in each destination queue and the MCU associated with the first cell in the queue. In operation 94, the packet is divided into one or more cells, which is referred to as "cellification." In one embodiment, cells are 34 bytes in length, with 30 bytes of data and 4 bytes of cell header information but may be of other lengths depending on the particular implementaion.

In operations 96-98, the cells are output-striped to the MCUs that manage the destination queues. In one embodiment, in operation 96, the cells are first transmitted in strict round robin order across a series of buffers referred to as the all tails buffer (ATB) which buffers the cells to avoid overflow. In one example, there is one first-in first-out (FIFO) ATB per MCU. In operation 98, the cells drain from the ATBs into the MCUs, which store the cells in the appropriate destination queue. One advantage of output-striping is that the striper, on average, uses all of the bandwidth to the MCUs equally within a single packet because the cells are written in one embodiment from the striper to the MCUs in a parallel arrangement, which spreads the cells around to all MCUs thereby using all of the available bandwidth to all the MCUs. Along with each cell of the packet, the destination queue that the cell is assigned to is sent to the MCU. The first cell of the packet is accompanied by control information about the packet, including the number of cells in the packet.

Figure 5D:
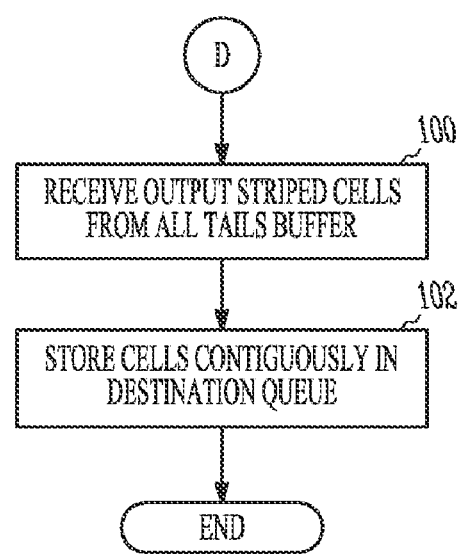
FIG. 5D illustrates a flowchart of an example of the operations for storing cells contiguously in memory as a function of the output for the packet, in accordance with one embodiment of the present invention.

Referring to FIG. 5D, in operation 100, the MCU receives the cells from the striper, vis-à-vis the ATB. In operation 102, the MCUs store the cells contiguously in the destination queue assigned to the packet. In one embodiment, the MCUs store the cells in strict round robin order in their assigned destination queue.

Embodiments of the router of the present invention has several important advantages over prior art devices. First, a destination queue for a packet is determined before the packet is cellified and stored by the switching engine. Accordingly, the cells for the packet may be stored in a contiguous order in the queues, which facilitates such extraction of the cells from the destination queues. In one embodiment, the cells are stored in the queue assigned to the packet in strict round robin order. Second, the striper communicates delta count information to the LCU so that the LCU can track the number of cells in each queue, and the MCUs associated with the head of the queues. Accordingly, the LCU may begin extracting cells from the destination queues as soon as the router is ready to transmit the packet. Third, the cells may be extracted from the assigned destination queue efficiently in the contiguous order that they were stored in the assigned destination queue. In the one embodiment, the LCU knows the location of the first cell in each queue (which is generally a head cell for a packet which specifies the number of cells for the packet); therefore, the LCU issues a request to the striper to transmit the cells from the MCUs in the same contiguous order in which they were placed in the assigned destination queue. Accordingly, additional memory pointers to cells, link lists of cells, and arrays of link lists of cells are not required because all of the cells of a packet are stored in a well known locations.

Figure 5E:
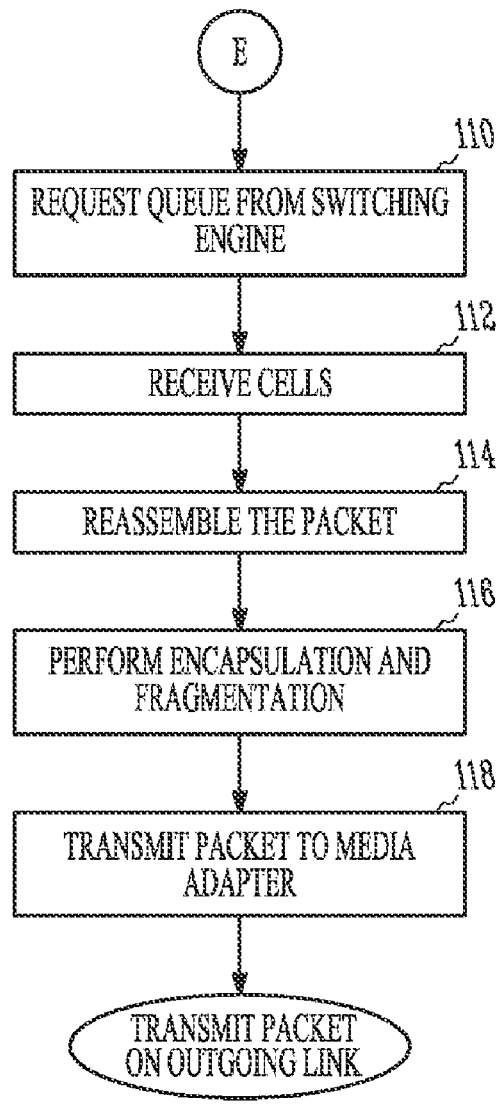
FIG. 5E illustrates a flowchart of an example of the operations for requesting cells from memory and reassembling the packet from the cells, in accordance with one embodiment of the present invention.

Referring to FIG. 5E, in operation 110, the LCU extracts cells from the switching engine by requesting a queue from the switching engine in order to process the cells within the queue. The LCU may include a queuing discipline that is continuously executing, and that determines when a particular queue should be serviced. When a queue is selected for service, the LCU sends a message to the MCU or to the striper, to transmit some number of cells from the queue to the LCU. In one example, the striper issues commands to the MCUs beginning with the MCU of the head cell, and then issuing commands in strict round robin order to the MCUs following the MCU with the head cell, until all of the cells for the packet are extracted from the assigned destination queue. After the extraction is complete, the head cell of the next packet in the queue will be at the beginning of the queue. In an alternative embodiment, the LCU may issue read requests directly to the MCUs in strict round robin order beginning with the head cell for the queue.

In operation 112, the LCU receives the cells. In one embodiment, once the LCU has received the head cell, it can request the remaining cells for the packet based on the total number of cells for the packet, which is specified in the head cell. After the MCU transmits a cell to the LCU, the MCU periodically transmits the number of cells remaining in each queue to the striper. This allows the striper to track the number of cells that are stored within the MCU so that it can perform random early discard (RED), which is a well known algorithm for randomly dropping packets, if the queue begins to overflow.

In operation 114, the LCU reassembles the packet from the received cells. The LCU tracks the read requests that it has made so that when cells arrive from the MCU, it can correctly reassemble and transmit complete packets. In one embodiment, the LCU tracks the order in which it transmitted requests to the striper, and the MCU is commanded to reply in the same order, so the LCU will receive cells in the same order that it transmitted requests. In operation 116, the LCU performs encapsulation and fragmentation of the packet as needed for transmission of the packet on the appropriate outgoing link. Finally, in operation 118, the LCU transmits the packet to the MA, which in turn transmits the packet on the port connected with the appropriate outgoing link for the packet.

The above described operations may be performed using one or more of the redundant and cut-down embodiments of the router described hereafter.

III. Redundancy and Scalability

A router conforming to the present invention is scalable and may be implemented in various scaled-down versions of the full-scale embodiment. Scalability allows the router to be configured to meet the immediate needs of each particular customer, and to be changed to meet the changing needs of the customer. As some scaled-down versions of the router also include one or more redundant switching engines that allows the scaled-down version to operate at its full capacity despite the disablement of an active switching engine. The following discussion first describes a full-scale router employing a redundant switching engine, and then discusses various scaled-down router configurations with and without a redundant switching engine, and the methodologies for implementing a scaled-down router.

A. Redundancy

Figure 6A:
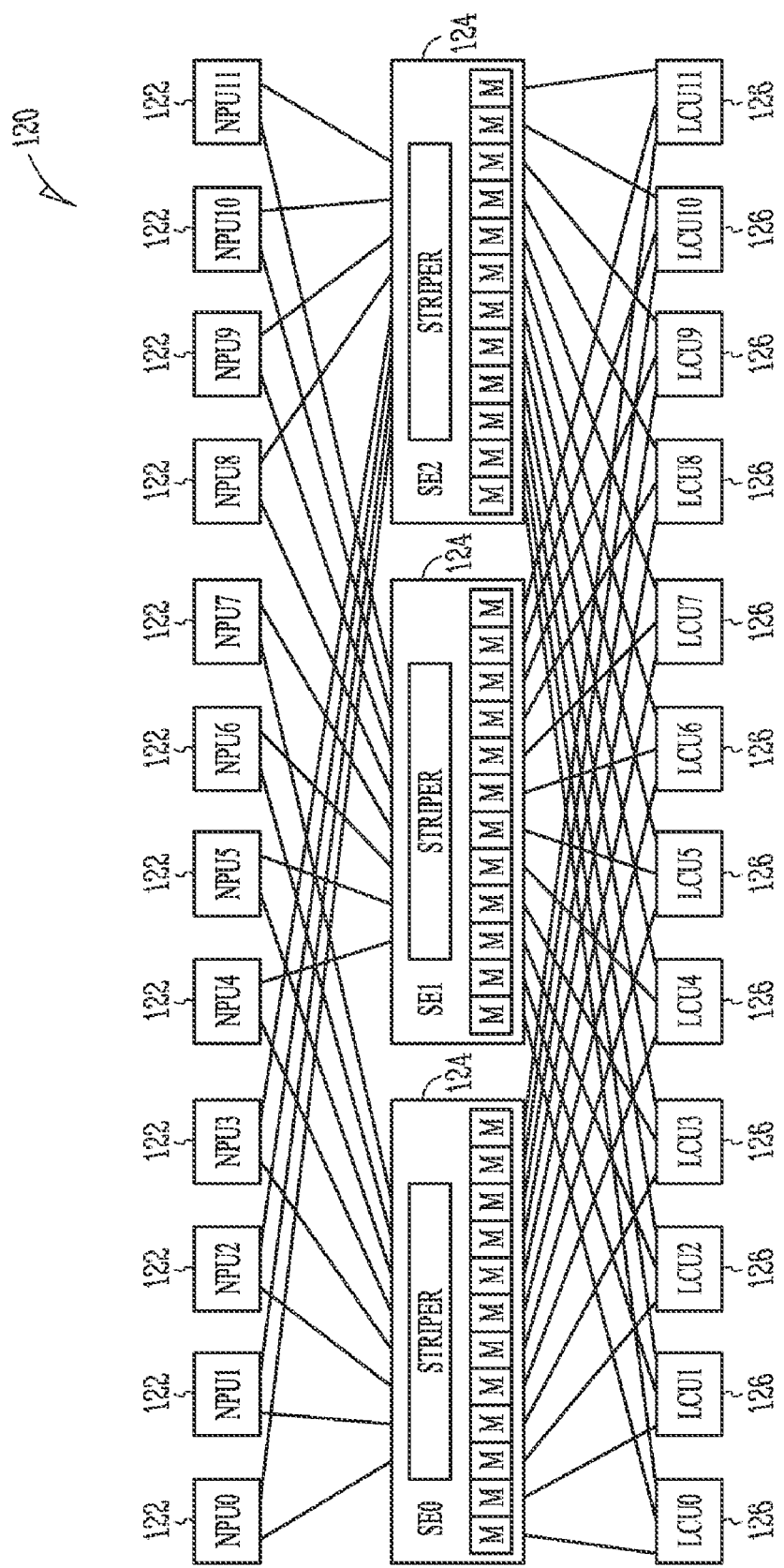
FIG. 6A illustrates a connective topology of a router, in accordance with one embodiment of the present invention.

Redundant router embodiments include at least one inactive switching engine on standby that can be activated in the event that a different switching engine is disabled, shut down, fails, etc. FIG. 6A illustrates the connectivity in a full-scale redundant router 120 between the input-side of the interface subsystems and the switching engines and between the switching engines and the output-side of the interface subsystems in accordance with one embodiment of the present invention. On the input-side, each NPU 122 is connected with two switching engines 124. There are, however, three switching engines in a full-scale redundant router. Two of the switching engines 124 are active, and one of the switching engines 124 is inactive and provides a redundant backup to the two active switching engines. In one example, the router 120 is adapted to route and switch packets at the line rate with one switching engine inactive and on standby.

To route and switch packets at the line rate on any combination of two active switching engines and one inactive switching engine, a redundant router 120 may include a rotational symmetric topology of connections between the NPUs 122 and the switching engines 124. The number of connections between the NPUs 122 and the switching engines 124 is 2*number of line cards, in one embodiment. The bandwidth may be divided between the two active switching engines to support all NPUs.

On the output-side, the switching engines 124 are connected with the LCUs 126 in a full-mesh topology of connections. In one example of a full-scale router conforming to the present invention, each of the switching engines 124 is able to transmit packets to any LCU 126 at the line rate. To achieve this, each LCU 126 has a full set of connections from all of the switching engines 124.

The connectivity on the input-side and on the output-side allows the router to operate even in the event of a switching engine 124 failure or shut down, provides bandwidth optimization for cell transmission between the switching engines 124 and the LCUs 126, and optimizes the number and complexity of the physical connections. For example, a full mesh of connections on the input-side would also allow the router to route and switch packets at the line rate with any combination of two active switching engines 124. However, in comparison with a rotational symmetric connective topology, about 50% more physical connections would be required in a full mesh connection topology between the NPUs 122 and the switching engines 124.

Figure 6B:
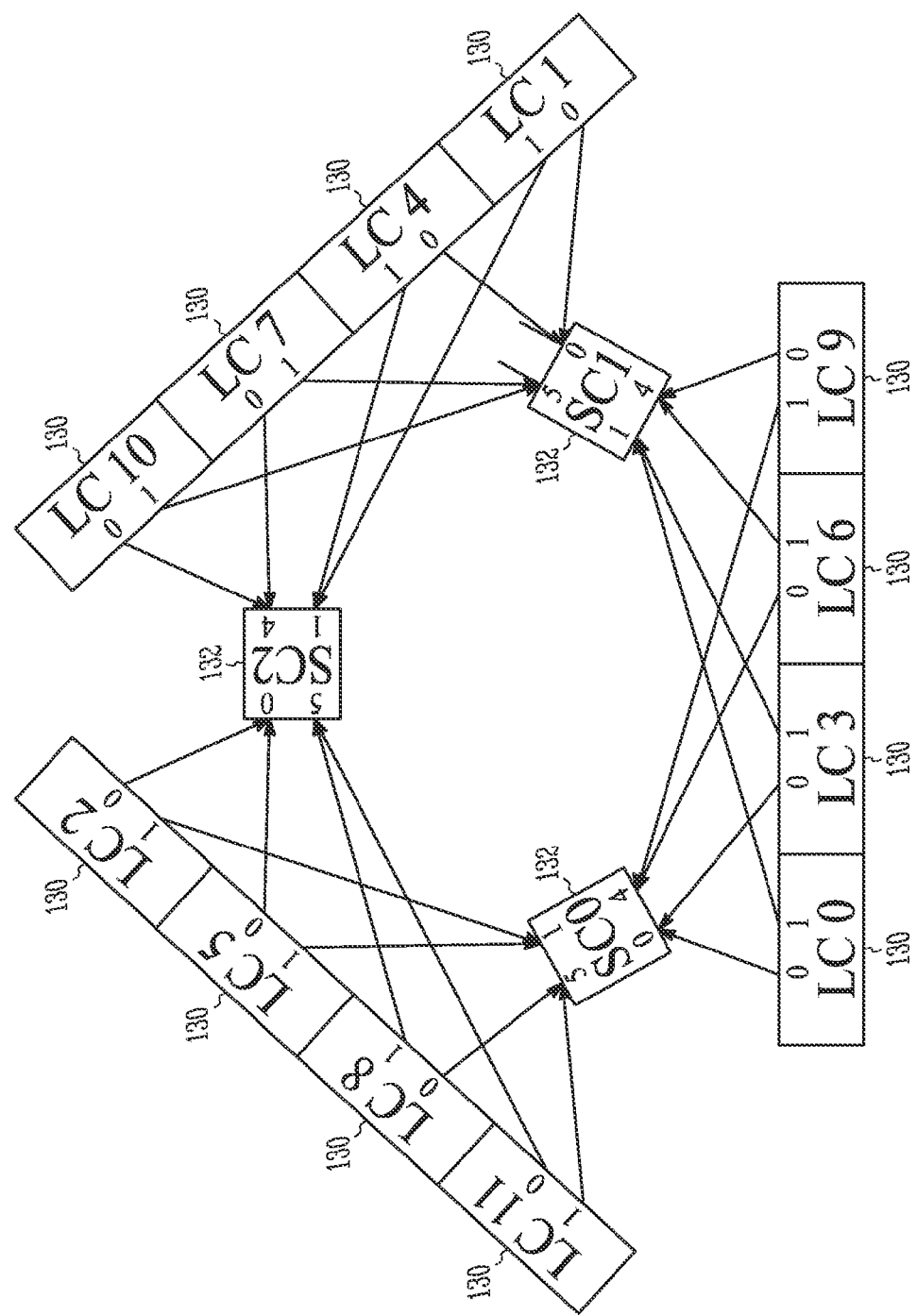
FIG. 6B illustrates a rotational symmetric connective topology of input-side of a router, in accordance with one embodiment of the present invention.

As shown in FIG. 6A, each NPU 122 is connected with two switching engines 124, wherein each connection is at 40 Gbps, in one example. The connective topology between the NPUs 122 and the switching engines 124 is referred to herein as "rotationally symmetric" or as having "rotational symmetry." FIG. 6B is a block diagram illustrating the rotational connective topology on the input-side of a full scale router conforming to the present invention. In FIG. 6B, each block labeled "LC" represents a linecard 130 having an associated NPU and each block labeled "SC" represents a switchcard 132, or switching engine, having an associated set of up to eight memory control units. The arrows represent the connections between the NPUs of the linecards 130 and the input-side of the switching engines.

In a rotational symmetric topology, in the event any active switching engine 132 is shut down, the inactive switching engine is activated and the NPU connections are rotated from the shut down switching engine to the activated switching engine. Using a rotational connective topology, a redundant router conforming to the present invention can achieve full redundancy with one switching engine 132 on standby, and with each NPU connected with two of the three switching engines 132.

In one embodiment of a full-scale router with all components operating (normal operation), each active switching engine has six active 40 Gbps connections with six of the twelve NPUs, for an aggregate incoming bandwidth of 240 Gbps per switching engine. Additionally, each switching engine has two inactive connections with two NPUs. During normal operation, there are two active switching engines (12 active 40 Gbps connections for 480 Gbps aggregate bandwidth into the stripers) and one switching engine on standby. The switching engine on standby is activated when either one of the active switching engines discontinues operating normally, such as from a switching engine failure or purposeful shut-down. When a switching engine is shut down, the active inputs from the shut down switching engine are rotated to either the remaining active switching engine or the activated standby switching engine. Accordingly, the aggregate bandwidth of 480 Gbps into the switching engines is maintained despite any failure or shut down of one switching engine.

Referring to FIG. 6A, to illustrate how active connections are rotated between the NPUs 122 and the switching engines 124, assume that switching engine 0 (SE0) is active with active inputs from $NPU_0$ to $NPU_5$, switching engine 1 (SE1) is active with active inputs from $NPU_6$ to $NPU_{11}$, and switching engine 2 (SE2) is on standby. Note, switching engine 0 also includes inactive connections with $NPU_6$ and $NPU_7$, switching engine 1 also includes inactive connections with $NPU_4$ and $NPU_5$, and switching engine 2 has inactive connections with $NPU_0$-$NPU_3$ and $NPU_8$-$NPU_{11}$. In the event that switching engine 0 is shut down, $NPU_0$ to $NPU_5$ will have to send packets to a different switching engine to maintain manual operation. In a rotational symmetric topology, switching engine 2 is activated and switching engine 0's active NPU connections are "rotated" to either active switching engine 1 or activated switching engine 2. In addition, some of active switching engine 1's connections are also rotated. The use of the term "rotate" and its forms, i.e., rotated, rotation, etc., as used herein is meant to refer to a change in active connections between the NPUs and the switching engines.

More particularly, $NPU_0$-$NPU_3$ are connected to switching engine 2, and $NPU_4$-$NPU_5$ are connected to switching engine 1. Thus, the active connection from $NPU_4$ and $NPU_5$ are rotated from shut down switching engine 0 to active switching engine 1, and the active connection from $NPU_0$ to $NPU_3$ are rotated from shut down switching engine 0 to activated switching engine 2.

Without additional rotation, switching engine 1 would have eight active connections and switching engine 2 would have four active connections. To process packets at line rate, each switching engine, in one example, has six active connections. Hence, some of the active connections to switching engine 1 are also rotated even though switching engine 1 was not shut down.

In one embodiment, the active connections from $NPU_6$-$NPU_9$ to switching engine 1 stay the same (i.e., to switching engine 1), and the active connections from $NPU_{10}$-$NPU_{11}$ to switching engine 1 rotate to switching engine 2. Thus, the active NPU connections associated with the shut down switching engine 0 are rotated to an active switching engine, which also causes rotation of some active NPU connections from still active switching engine 1 to activated switching engine 2.

In a second illustration of active connection rotation, assume that switching engine 0 and 1 are active and switching engine 2 is on standby like the example above, but switching engine 1 is shut down. Now $NPU_6$-$NPU_{11}$ will have to send packets to a different switching engine. In the rotational symmetric topology, standby switching engine 2 is activated and switching engine 1's active NPU connections are rotated to active switching engines. In one example, the active connections from $NPU_8$-$NPU_{11}$ and $NPU_0$-$NPU_1$ are rotated to actively connect with switching engine 2, active connections from $NPU_2$-$NPU_5$ stay the same (i.e., to switching engine 0), and $NPU_6$-$NPU_7$ are rotated to actively connect with switching engine 0.

Referring to FIG. 6B, an alternative rotational symmetric connective topology is illustrated. In this example, switchcard zero (SC0) includes a connection with linecards LC0 at port 0, LC2 at port 1, LC3 at port 6, LC5 at port 7, LC6 at port 3, LC8 at port 5, LC9 at port 4, and LC11 at port 2; switchcard one (SC1) includes a connection with linecards LC0 at port 6, LC1 at port 0, LC3 at port 1, LC4 at port 7, LC6 at port 4, LC7 at port 5, LC9 at port 3, and LC10 at port 2; and switchcard two (SC2) includes a connection with linecards LC1 at port 1, LC2 at port 0, LC4 at port 7, LC5 at port 6, LC7 at port 4, LC8 at port 2, LC10 at port 3, and LC11 at port 5.

With a rotationally symmetric topology, all NPUs can remain actively connected with an active switching engine regardless of which switching engine is active, and the active connectivity can be maintained with less than a full mesh (where each NPU is connected to all of the switching engines) of physical connections therebetween. Such a rotational symmetric connection topology is advantageous, in part, because it reduces the number of connections required between the NPUs and the striper without sacrificing performance. The reduction of physical connections has numerous related benefits, such as reducing backplane complexity, reducing system noise, improving reliability, reducing cost, improving manufacturing reliability and performance, and the like.

Alternatively, a redundant full-scale router can have four switching engines each with four active NPU inputs and at least two inactive inputs. In the event of a failure of any one switching engine, the active NPU inputs can be switched to an adjacent switching engine. For example, in the case of switching engines with two inactive inputs, two inputs from the shut down switching engine are connected with the switching engine to one side, and two inputs are connected with the switching engine to the other side. In a second alternative, a redundant router can have the NPUs connected with the switching engines in a full-mesh input topology where each NPU is connected with each switching engine.

Referring to FIG. 6A, the output-side connectivity between the switching engines and the LCUs is a full-mesh topology, in one example. In the full-mesh topology, each switching engine 124 has a connection with each LCU 126, so that any switching engine 124 can transmit packets to any of the LCUs 126 and accordingly to any outgoing link. In this configuration, one third of the connections between the LCUs 126 and the switching engines 124 are inactive, i.e., from the inactive switching engine.

B. Scalability—Cut-Down Routers

A router conforming to the present invention may also be scalable so that it can be tailored to a customer's needs, and upgraded as the customer's needs change. In many instances, a customer will not initially require a full-scale router, which is capable of routing and switching packets at an aggregate bandwidth of about 480 Gbps, which under some standards translates to an incoming and outgoing packet processing rate of about 1 Terabit per second. Rather, some customer's immediate needs will be for a scaled-down or cut-down router, which can be priced to reflect the performance of the cut-down router. To meet the needs of customers with increasing networking requirements, it is desirable to provide a scalable router that may be upgraded. Moreover, it is desirable to provide scalability while utilizing as much of the same physical components as used in the full-scale router to take advantage of economies of scale, streamline production, reduce complexity, and the like.

Cut-down embodiments of the router are achieved by reducing the number of switching engines, the number of MCU's, the number of LCU's, or some combination thereof. To provide cut-down routers using full-scale router components, programming changes to the striper and connectivity changes between the MCUs and the LCUs are needed for unicast packet routing. For packets entering the switching engine, programming changes in the striper map the number of MCUs per switching engine in a full-scale router (virtual MCUs) to some reduced number of MCUs actually present in the cut-down router (physical MCUs). Additionally, programming changes in the striper map the queues in a full-scale router to a reconfigured set of queues in the cut-down router. For packets leaving the switching engines, programming changes in the striper translate requests for packets from the LCU (as if in a full-scale router) to a suitable request for a cut-down router. To implement connectivity changes, a variety of backplanes can be used, in one example. For some scaled-down router embodiments, a common backplane, such as the full-scale backplane, may be used, and for other cut down embodiments a unique backplane may be used. In embodiments of the cut-down router described below, the MA, NPU, LCU, and MCU (with associated memory) may be used without any physical change. For multicast traffic, a small change to the MCU is implemented, in one example, which is discussed in more detail below. Conceptually, the majority of the components in a cut-down router function as if in a full-scale router with a full complement of MCUs and queues. In cut-down router embodiments, a reduced number of physical MCUs perform the function of a full complement of MCUs. Each physical MCU masquerades as one or more virtual MCUs. When referring to a cut-down router, "virtual MCU" refers to an MCU in a full-scale router. Thus, the NPUs, LCUs, and other components operate as if in a full system, and the striper manages traffic to and from the reduced number of MCUs. With a reduced number of physical MCUs appearing as if a full complement of MCUs were present, each LCU conceptually behaves as though it were in a full-scale router with a full complement of MCUs in the switching engines and so receives cell data, delta count information, and notifications over all of its input ports.

The output-side of the MCU is affected in generally the same way as the LCU inputs. Each MCU conceptually behaves as though it were in a full-scale router and so uses all of its output bundles to the LCUs. Thus, each physical LCU is also masquerading as multiple virtual LCUs in order for the MCU to operate the same way that it does in a full-scale router.

On the input-side, each MCU receives cells from the striper on a single wiring bundle, which requires no connectivity changes as compared with the full-scale router. On the output-side, the MCU outputs for the remapped queues are wired to support the actual number of LCUs in the cut-down router. In one example, the wiring change is accommodated with a different switchcard and/or backplane for each cut-down configuration.

In this manner, the fact that the router is a cut-down system is transparent to the components and software of the router, other than the stripers. Various schematic diagrams illustrating the connections between the NPUs and MCUs and between the MCUs and LCUs for various cut-down embodiments are illustrated in FIGS. 8A-D, 9A-D, 10A-C, 11, 12, 13 and 15, which are discussed in more detail below.

Figure 7A:
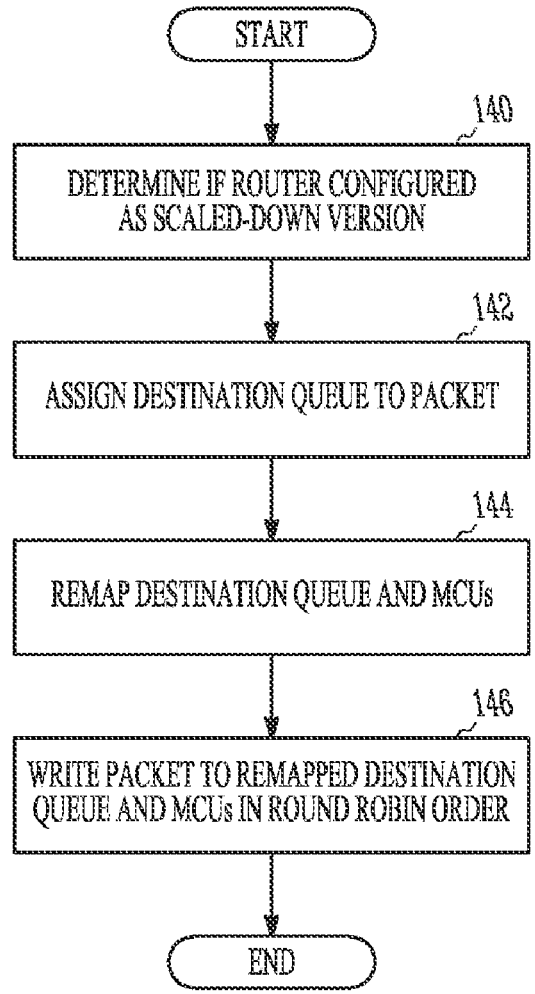
FIG. 7A illustrates a flowchart of an example of the operation for routing and switching a packet in a cut-down router, in accordance with one embodiment of the present invention.

Referring now to FIG. 7A, a method of switching a packet in a cut-down router is shown. In operation 140, the router, upon start-up or otherwise, determines if it is configured as a scaled or cut-down router. In one example, the router determines how many line cards, switch cards, and MCUs are present. In operation 142, the router assigns a destination queue to the packet. In one example, operation 142 is performed before the packet is cellified and stored in the switching memory. In operation 144he assigned destination queue is remapped to account for the reduced number of LCUs and/or MCUs in a cut-down router. Finally, in operation 146he packet is cellified and written to the remapped destination queues in round robin order.

Figure 7B:
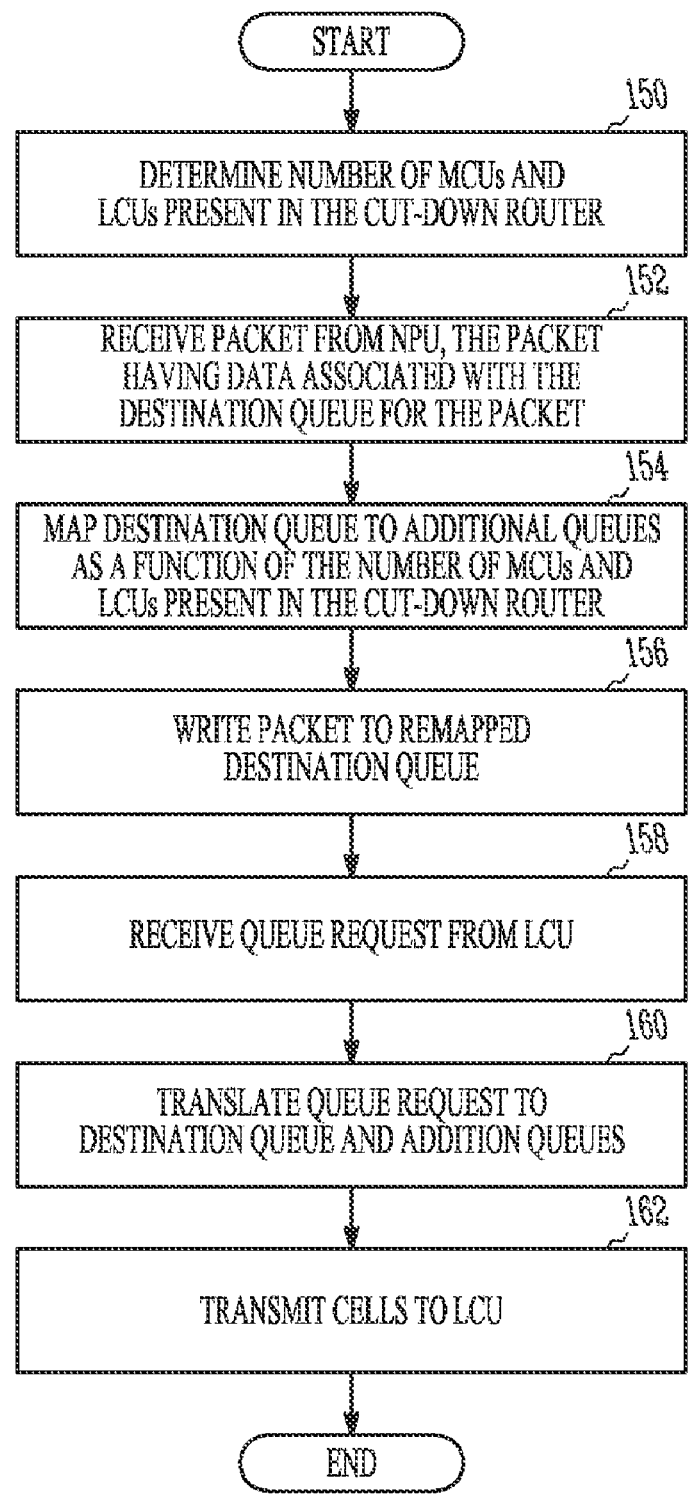
FIG. 7B illustrates a flowchart of an example of the operations for routing and switching a packet in a cut-down router, in accordance with one embodiment of the present invention.

Referring now to FIG. 7B, a second method of switching a packet in a cut-down router is shown. In operation 150, it is determined how many MCUs and LCUs are present in the cut-down router, which information is used to determine queue remapping. In operation 152, the striper receives a packet from the NPU. The packet includes information regarding the outgoing link for the packet. In one example, the packet includes a packet context or data associated with or defining a destination queue assigned to the packet. Each destination queue in the router is associated with an outgoing link.

In operation 154, the original assigned destination queue is mapped to the assigned destination queue and one or more additional destination queues as a function of the number of MCUs and LCUs present in the cut-down router. Each MCU has 12 output bundles associated with the 12 LCUs in a full-scale router. The destination queues are thus divided by a factor of 12 so that queues are evenly associated with LCUs. In one example, each input bundle of the LCU is connected with an MCU regardless of the number of MCUs and LCUs present in the cut-down system.

Hence, if there is one LCU and two MCUs, then each MCU has six connections with the LCU. Or, if there are two LCUs and four MCUs, then each MCU has three connections with the two LCUs. To properly write packets to switching memory in a cut-down router, a plurality of destination queues are aggregated to function as the originally assigned full-scale destination queue.

In the example of one LCU and two MCUs (see FIG. 13) six ports of both MCUs are connected to the LCU in an alternating manner so that the LCU has a connection from one of the two MCUs on all of its twelve input ports. In a full-scale configuration, each of the 12 output ports of an MCU are connected with one LCU, and each destination queue is associated with one of the 12 LCUs and hence one of the 12 output ports of the MCU. For example, queue 0 is mapped to MCU output port 0 and LCU 0, queue 1 is mapped to MCU output port 1 and LCU 1, queue 2 is mapped to MCU output port 2 and LCU 2, etc. In the example cut-down router, there is only one LCU, so LCU 1 through LCU 11 do not exist. Hence, queue 0 is mapped to queues 1-5 by the striper, and output ports 0-5 of both MCUs are physically connected with LCU 0. In this manner, queues 0-5 across two MCUs effectively become an extension of queue 0 as if across 12 MCUs, and both the MCUs and the LCU are unaware that they are part of a cut-down router. Packets destined for queue 0 are mapped to the two MCUs and queues 0-5.

In operation 156 of FIG. 713, the packet is written to the remapped destination queue and MCUs. In operation 158, the LCU issues a request to the striper for a cell or cells in a destination queue using substantially the same processes as described herein with regard to the full-scale router. Hence, the LCU acts as if in a full-scale router. In operation 160, the striper translates the request to the remapped MCUs, and the remapped destination queues. In operation 162, the MCUs transmit the cells to the LCU based on the direction of the striper. Referring again to the example of a cut-down router having one LCU and two MCUs, the striper translates a request for the next packet in queue 0, to a command to MCUs 0 and 1, to transmit the packet from queues 0-5. Recall, queues 0-5 are associated with output ports 0-5, which are connected with the LCU. Hence, the remapped request from the striper results in the packet being sent to the LCU.

Because the alterations to accommodate a cut-down system are limited to the striper (and in some instances to the MCU) and to the connectivity between the MCU and LCU, the full-scale router 2+1 redundancy described above can also be used in the cut-down routers. Additionally, 1+1 redundancy, up to and including a cut-down router of half of the full-scale router capacity, is also possible, and routers without redundancy are also possible.

The striper is capable of receiving 40 Gbps from each of six active NPUs in the full-scale router. In one example, a cut-down router with six or fewer NPUs and no redundancy, requires only one striper and therefore only one switching engine. In another example, a cut-down router with six or fewer NPUs, but with redundancy, will have two stripers. To satisfy the bandwidth requirement for either example, a reduced number of MCUs and their associated memory subsystems are required.

During start-up or boot-up operations of a cut-down router, the striper is informed of how many MCUs are present. In one example, the number of MCUs on a switchcard in a cut-down router is an even factor of the full-scale router switchcard MCU count, which in one example is twelve. Hence, cut-down routers will have twelve, six, four, or two MCUs per switchcard. The striper uses the MCU count to remap the MCUs and the queues which, in part, allows the striper to output stripe cells across the MCUs and queues uniformly.

Figure 8A:
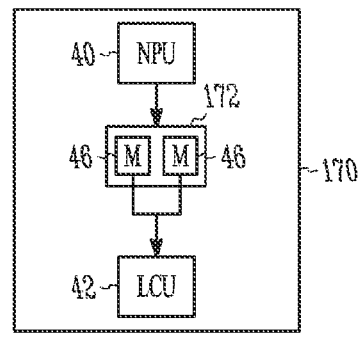
FIGS. 8A-8D illustrates examples of cut-down router topologies for routers having no redundancy, in accordance with one embodiment of the present invention.
Figure 8B:
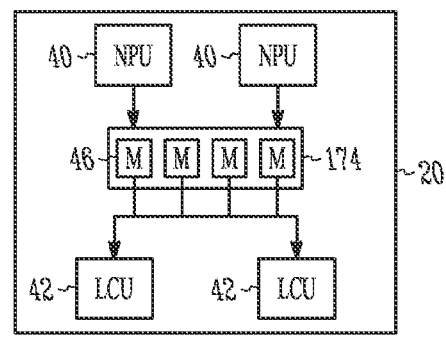
Figure 8C:
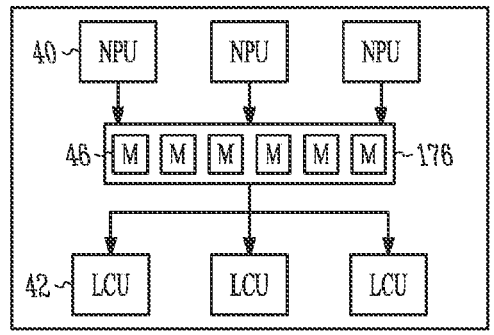
Figure 8D:
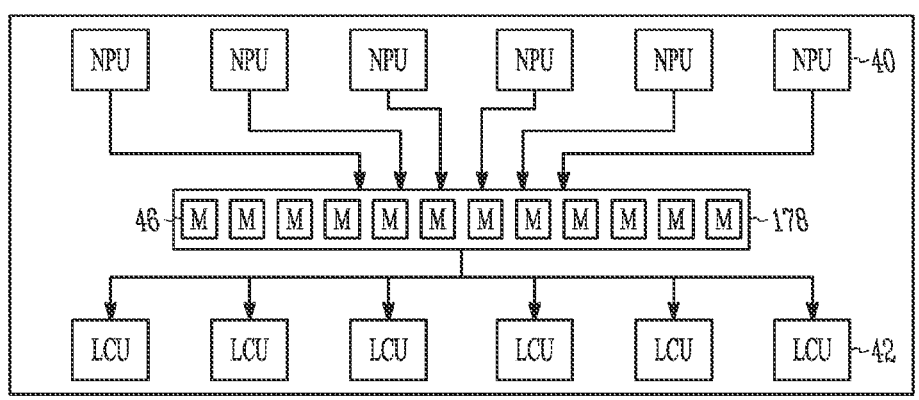

There are various possible configurations of a cut-down router, depending in part on the processing requirements for the router and the redundancy utilized. FIGS. 8A-8D illustrate cut-down topologies with no redundancy, wherein FIG. 8A shows a router 170 with one LCU/NPU 42/40 and two MCUs 46 on a single switchcard 172; FIG. 8B shows two LCUs/NPUs 42/40 and four MCUs 46 on a single switchcard 174; FIG. 8C shows three LCUs/NPUs and six MCUs on a single switchcard 176; and FIG. 8D shows six LCUs/NPUs and twelve MCUs on a single switchcard 178.

Figure 9A:
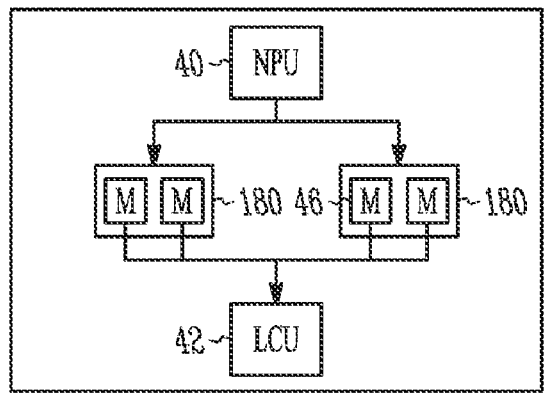
FIGS. 9A-9D illustrates examples of cut-down router topologies for routers having 1+1 redundancy, in accordance with one embodiment of the present invention.
Figure 9B:
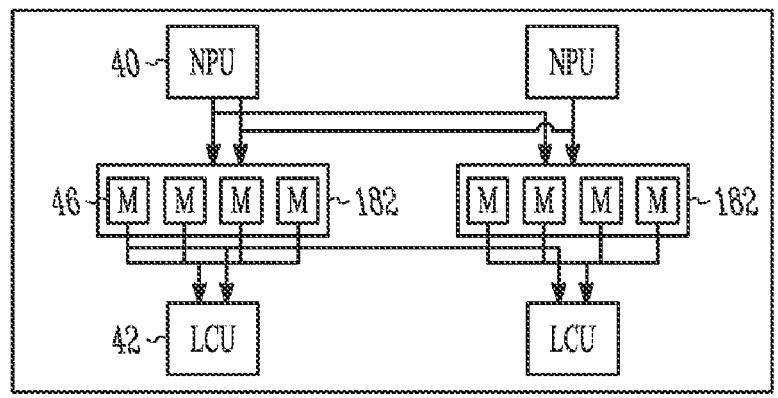
Figure 9C:
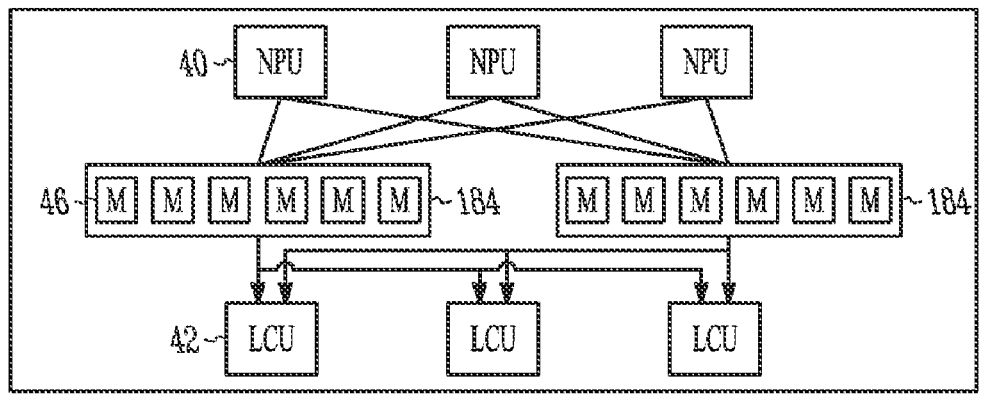
Figure 9D:
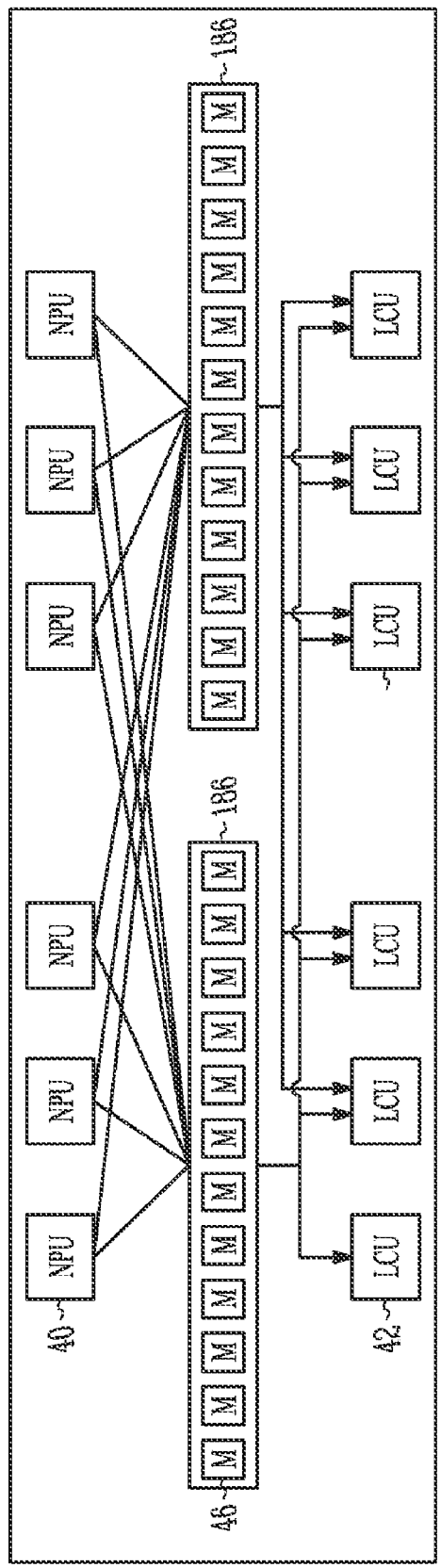

FIGS. 9A-9D illustrate "1+1" redundant cut-down topologies, wherein FIG. 9A shows one LCU/NPU and four MCUs on two switchcards 180; FIG. 9B shows two LCUs/NPUs and eight MCUs on two switchcards 182; FIG. 9C shows three LCUs/NPUs and twelve MCUs on two switchcards 184; and FIG. 9D shows six LCUs/NPUs and twenty-four MCUs on two switchcards 186. In the "1+1" redundant embodiments illustrated in FIGS. 9A-9D, there are two switching engines with one of the two switching engines active, and the other on standby. In the event that the active switching engine is shut down, the standby switching engine is activated and all active connections are switched to the activated standby switching engine.

Figure 10A:
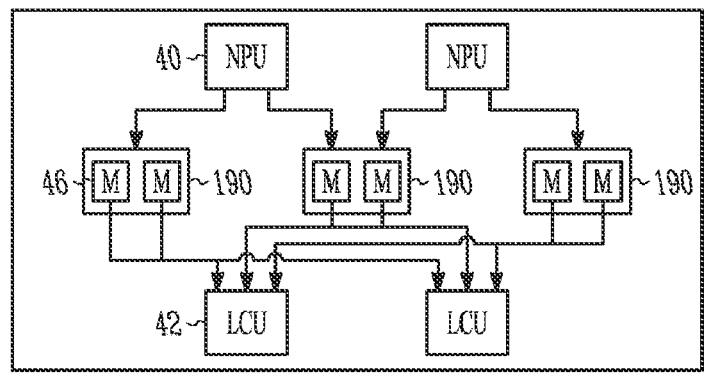
FIGS. 10A-10C illustrate examples of cut-down router topologies for routers having 2+1 redundancy, in accordance with one embodiment of the present invention.
Figure 10B:
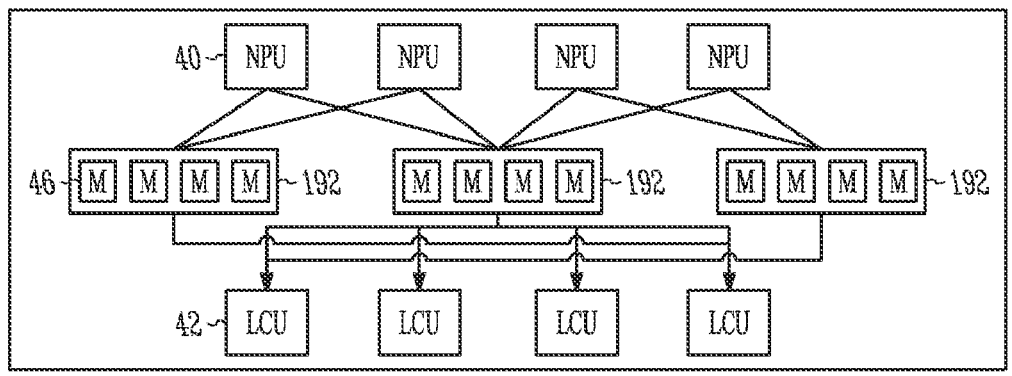
Figure 10C:
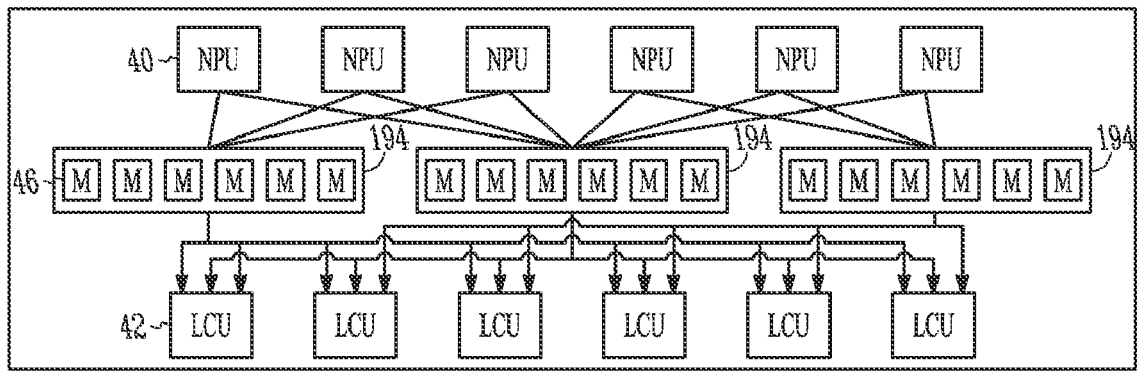

FIGS. 10A-10C illustrate "2+1" redundant cut-down topologies, wherein FIG. 10A shows two LCUs/NPUs and six MCUs on three switchcards 190; FIG. 10B shows four LCUs/NPUs and twelve MCUs on three switchcards 192; and FIG. 10C shows six LCUs/NPUs and eighteen MCUs on three switchcards 194. In the "2+1" redundant topologies, two switchcards are active and one switchcard is on standby as described above in section III.A ("Redundancy"). In the event that one of the active switching engines is shut down, the standby switching engine is activated and the active connections are rotated to the appropriate active switching engines.

In cut-down embodiments conforming to the present invention, a set of mappings describes the operational changes to the striper and the wiring between the striper and MCUs. The mappings define the logic in the striper and the wiring on a cut-down router's switchcard.

Definition of Constants:

$N_{MCU}$=Number of MCUs in one switching engine (i.e., switchcard) in the cut-down router.

$N_{LCU}$=Number of LCUs in the cut-down router.

To manage each cell or cell-request to an MCU with the reduced number of MCUs in a cut-down router, the striper maps a virtual MCU (the MCU to which the cell or request would have been sent in a full-scale router) to a physical MCU (the MCU to which the cell or request is sent in the cut-down router) in a round robin manner using the following modulo mapping:

$$\text{Physical MCU number} = (\text{virtual MCU number}) \mod (N_{MCU}) \quad (1)$$

Similarly, to manage the transmission of cells from the MCUs to LCUs a mapping between a physical LCU (the LCU where the cell actually arrives) and a virtual LCU (the LCU that the MCU would have sent the cell to in a full-scale router) is utilized. To insure correct cell routing, the striper translates the physical LCU to the virtual LCU for each cell or cell request that is sent to a MCU. In the MCU, a set of queues are dedicated to each LCU, and the virtual LCU designates the set of queues to use and the corresponding exit bundle or output from the MCU to the appropriate LCU, in a cut-down implementation.

In one example, the striper computes the virtual LCU number using the following equation:

$$\text{virtual } LCU \text{ number} = \text{int}\left(\frac{\text{virtual } MCU \text{ number}}{N_{MCU}}\right) * N_{LCU} + \text{physical } LCU \text{ number} \quad (2)$$

The "$\text{int}\left(\frac{\text{virtual } MCU \text{ number}}{N_{MCU}}\right)$" portion of equation (2) effectively groups the virtual MCUs and then computes the index of the group where each group is of size $N_{MCU}$. Within each group, the cyclic assignment of MCU output ports is interleaved in groups of $N_{LCU}$ ports, and then the physical LCU index selects the offset within that group.

Figure 17:
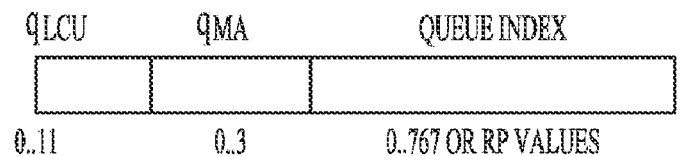
FIG. 17 illustrates an example of partitioning of a queue, in accordance with one embodiment of the present invention.

To distinguish between the cells for different virtual MCUs, which are stored in one physical MCU, the striper remaps the queues. The partitioning of the queues may be as shown in FIG. 17, where the queue number $q_{LCU}$ is the queue assigned by the NPU to the packet in a full-scale router; and $q_{MA}$ corresponds to the media adapter.

This partitioning operation affects the queue number field ($q_{LCU}$ field) and can be expressed as follows:

$$\text{virtual } LCU \text{ number} = \text{int}\left(\frac{\text{virtual } MCU \text{ number}}{N_{MCU}}\right) * N_{LCU} + \text{physical } LCU \text{ number} \quad (3)$$

$$q_{LCU} \text{ seen by } MCU = \text{int}\left(\frac{\text{virtual } MCU \text{ number}}{N_{MCU}}\right) * N_{LCU} + (q_{LCU} \text{ given by NPU}) \quad (4)$$

The above-described partitioning operation limits the NPU forwarding table to assigning packets to queues with the queue number field ($q_{LCU}$) within the range:

$$\{0 \ldots N_{LCU}-1\}$$

The NPU does not generate $q_{LCU}$ numbers outside this range. The following table provides exemplary mappings according to the above-described calculations for a variety of cut-down router embodiments.

Figure 11:
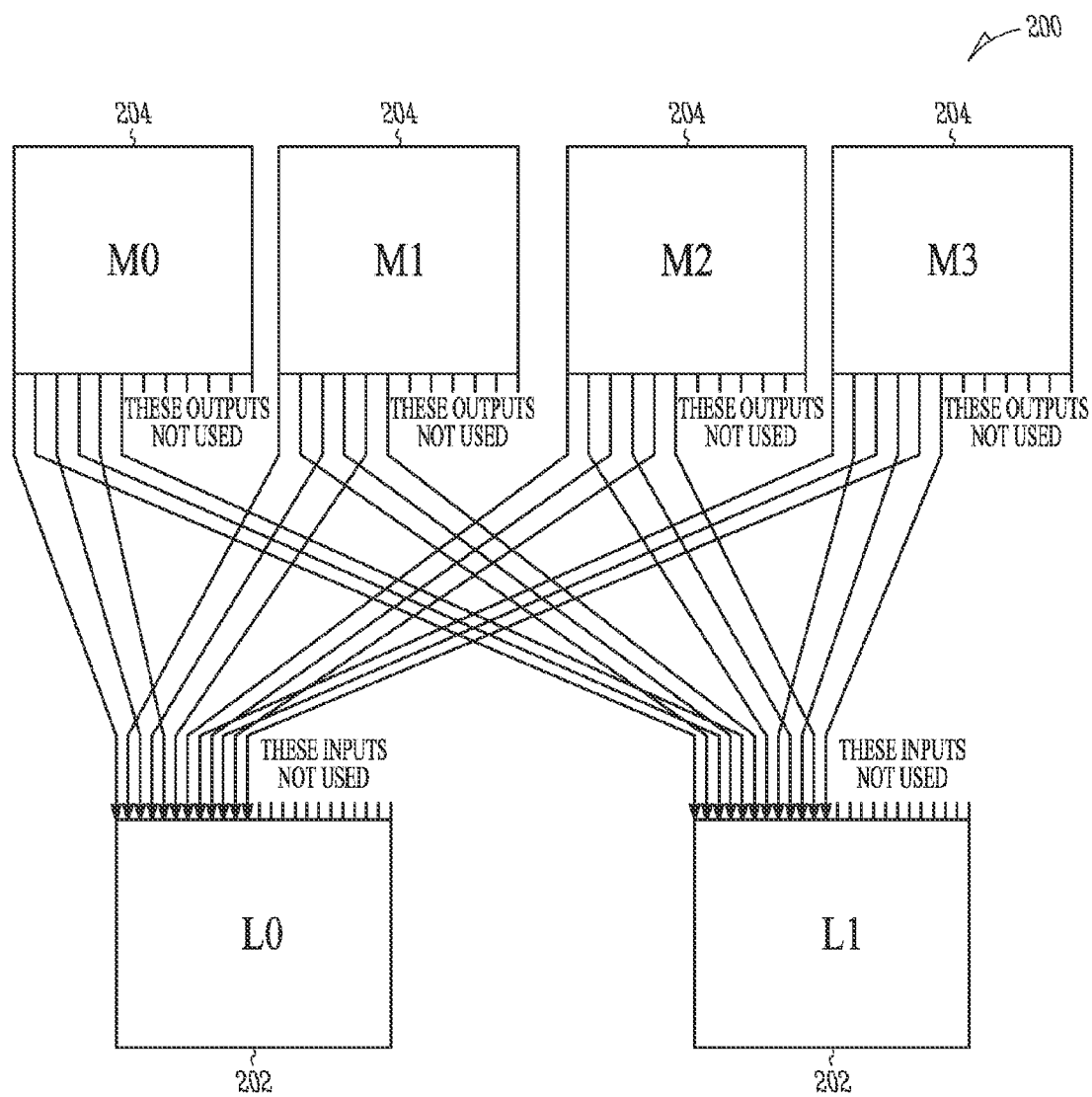
FIG. 11 illustrates a cut-down router comprising four MCUs and two LCUs, in accordance with one embodiment of the present invention.

FIG. 11 illustrates the connectivity, in one example, between the MCU's and the LCU's for of a cut-down router 200 with two LCUs 202 and with one switching engine having four MCUs 204 according to the above-described formulation for connectivity. In this embodiment, half of the MCU outputs are connected with the two LCUs, and the other half of the MCU outputs are unconnected because they are unused in a cut-down router having only a single switching engine. The unconnected outputs would be employed by a router having an additional two linecards. In this example, the router could have another four MCUs in a second switching engine to provide sufficient bandwidth. In the embodiment illustrated in FIG. 11, the LCU 202 has one third of its available inputs connected with the MCUs 204. The remaining unconnected two thirds of the inputs are unused, but may be connected with second switchcard (1+1 redundancy) or a third switchcard (2+1 redundancy) if the cut-down router is scaled-up.

The following table shows one mapping between the MCU output ports (o) and the LCU input ports (i) for the embodiment illustrated in FIG. 11, and according to the above described formulations.

TABLE 1

Queue remapping for cut-down routers having (a) one LCU and two MCUs, (b) two LCUs and four MCUs, and (c) three LCUs and six MCUs.

| MCU # selected by striper in full-scale router | N_LCU = 1 N_MCU = 2 (FIG. 13) | | N_LCU = 2 N_MCU = 4 (FIG. 15) | | N_LCU = 3 N_MCU = 6 | |
|---|---|---|---|---|---|---|
| | MCU # cell sent to in Cut-Down Router | Queue Offset | MCU # cell sent to in Cut-Down Router | Queue Offset | MCU # cell sent to IN Cut-Down Router | Queue Offset |
| 0 | 0 | 0 | 0 | 0 | 0 | 0 |
| 1 | 1 | 0 | 1 | 0 | 1 | 0 |
| 2 | 0 | 1 | 2 | 0 | 2 | 0 |
| 3 | 1 | 1 | 3 | 0 | 3 | 0 |
| 4 | 0 | 2 | 0 | 2 | 4 | 0 |
| 5 | 1 | 2 | 1 | 2 | 5 | 0 |
| 6 | 0 | 3 | 2 | 2 | 0 | 3 |
| 7 | 1 | 3 | 3 | 2 | 1 | 3 |
| 8 | 0 | 4 | 0 | 4 | 2 | 3 |
| 9 | 1 | 4 | 1 | 4 | 3 | 3 |
| 10 | 0 | 5 | 2 | 4 | 4 | 3 |
| 11 | 1 | 5 | 3 | 4 | 5 | 3 |

To support these transformations of queue numbers in the striper, the wiring or connectivity between MCUs and LCUs is configured differently in some instances for a cut-down router as compared with a full-scale router. The following provides one method for determining the connectivity.

Definition of constants:

There are $N_{MCU}$ MCUs per switchcard in a cut-down router.

There are $N_{LCU}$ LCUs in a cut-down router.

To specify the connection between output o of MCU M to input i of LCU L the following formulations (5) and (6) may be used:

$$\text{Output } o \text{ of MCU } M \text{ connects to LCU } L = o \bmod N_{LCU}. \quad (5)$$

$$\text{input } i = M + N_{MCU} * \text{int}(o/N_{LCU}) \quad (6)$$

TABLE 2

Port mapping between MCU and LCU in a cut-down router having 2 LCUs and 4 MCUs.

| MCU M | Output o | LCU L | Input i |
|---|---|---|---|
| 0 | 0 | 0 | 0 |
| 0 | 1 | 1 | 0 |
| 0 | 2 | 0 | 4 |
| 0 | 3 | 1 | 4 |
| 0 | 4 | 0 | 8 |
| 0 | 5 | 1 | 8 |
| 1 | 0 | 0 | 1 |
| 1 | 1 | 1 | 1 |
| 1 | 2 | 0 | 5 |
| 1 | 3 | 1 | 5 |
| 1 | 4 | 0 | 9 |

TABLE 2-continued

Port mapping between MCU and LCU in a cut-down router having 2 LCUs and 4 MCUs.

| MCU M | Output o | LCU L | Input i |
|---|---|---|---|
| 1 | 5 | 1 | 9 |
| 2 | 0 | 0 | 2 |
| 2 | 1 | 1 | 2 |
| 2 | 2 | 0 | 6 |
| 2 | 3 | 1 | 6 |
| 2 | 4 | 0 | 10 |
| 2 | 5 | 1 | 10 |
| 3 | 0 | 0 | 3 |
| 3 | 1 | 1 | 3 |
| 3 | 2 | 0 | 7 |
| 3 | 3 | 1 | 7 |
| 3 | 4 | 0 | 11 |
| 3 | 5 | 1 | 11 |

A cut-down router that employs only a single switchcard uses only half of the MCU output connections. This is true both for fully populated switchcards and for ones in a cut-down router. In a cut-down router that employs two switchcards, or more, the MCUs use all their output bundles to connect to the other half of the outgoing linecards or LCUs, in one example.

Figure 12:
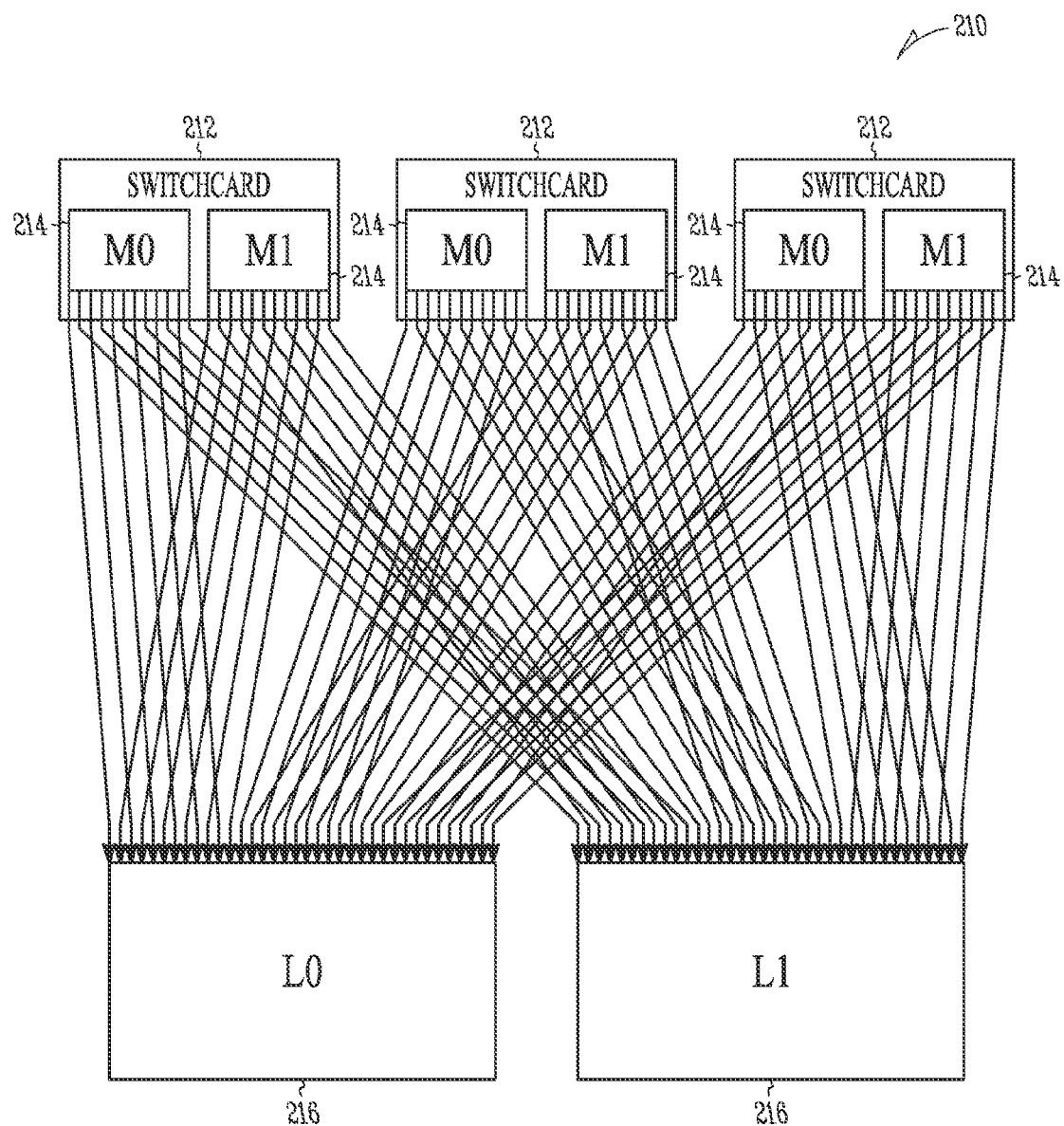
FIG. 12 illustrates a cut-down router comprising two LCUs and three switching engines, each having two MCUs, in accordance with one embodiment of the present invention.

FIG. 12 illustrates the connectivity between the MCUs and the LCUs in a 2+1 redundant cut-down router 210 with three switching engines 212 each having two MCUs 214, and with two LCUs 216. In this example, six wiring bundles from each MCU 214 go in parallel to each LCU 216. The 2+1 redundant cut-down router illustrated in FIG. 12 may use the same backplane as a full-scale router.

Figure 13:
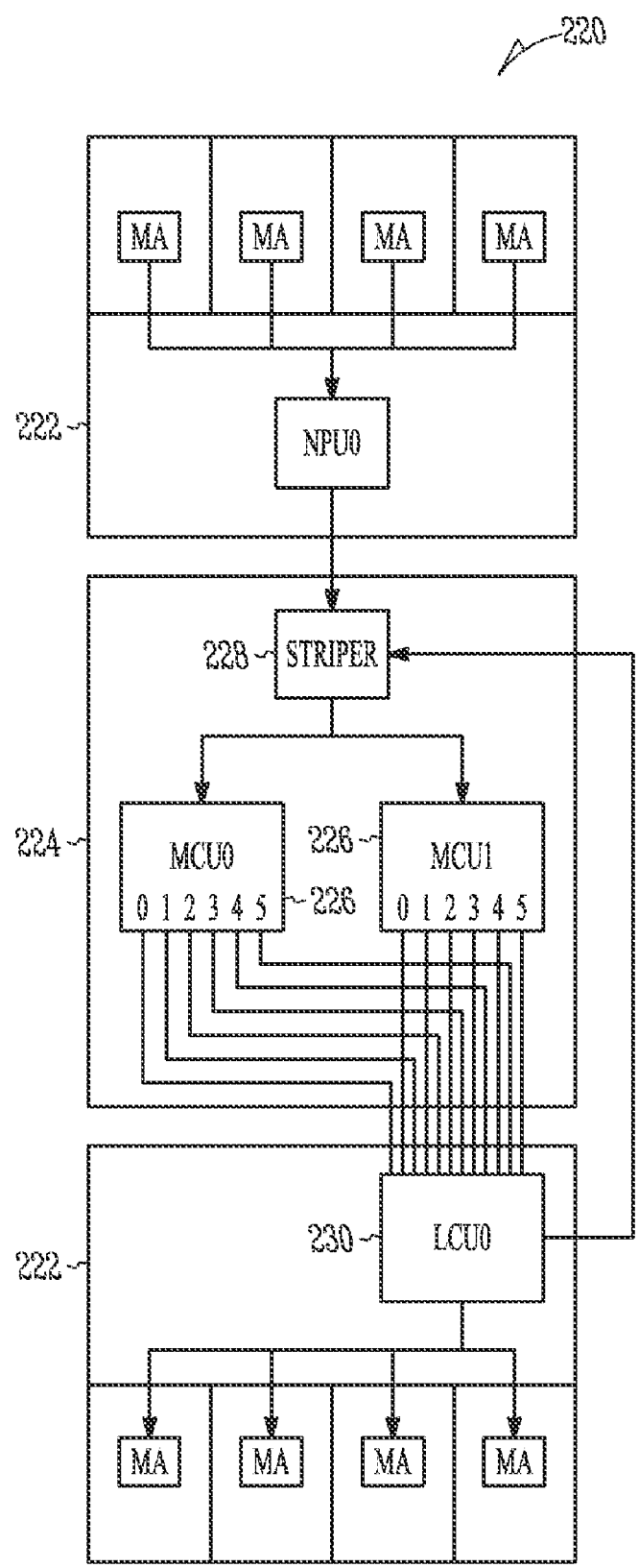
FIG. 13 illustrates a cut-down router comprising one LCU, one NPU, and one switching engine having two MCUs and one striper, in accordance with one embodiment of the present invention.

FIG. 13 illustrates a cut-down router 220 with one fully populated linecard 222 ($NPU_0$, $LCU_0$, four MAs) and a switchcard 224 having two MCUs 226 ($MCU_0$ and $MCU_1$) and a striper 228. The performance of this cut-down router is about 40 Gbps. The following table describes how the cells of a packet are distributed by the striper 228 and received by the LCU 230 ($LCU_0$ in this case) for the cut-down router illustrated in FIG. 13. In this example, the cells are all destined for queue 0 if in a full-scale router.

TABLE 3

Example of cut-down router with one LCU and two MCUs

Writing cells to switching memory in cut-down router
striper logically writes cells across MCUs as if in a full-scale router (Virtual MCU number): 0 1 2 3 4 5 6 7 8 9 10 11
Physically, striper directs cells towards MCUs in the cut-down router as follows:

(Physical MCU number): 0 1 0 1 0 1 0 1 0 1 0 1
striper remaps the queues as follows based on the number of MCUs in the cut-down router:

(Queue number) 0 0 1 1 2 2 3 3 4 4 5 5
From a connectivity perspective, MCU output ports (o) are coupled to $LCU_0$ input ports (i) as follows:

$MCU0_0$:$LCU0_1$ (o:i)    0:0   1:2   2:4   3:6   4:8   5:10
$MCU1_0$:$LCU0_1$ (o:i)    0:1   1:3   2:5   3:7   4:9   5:11

Requesting cells from switching memory in cut-down router:
LCU0 starts by requesting cells from Q0 as if across a full set of MCUs (Q:MCU)    0:0 0:1 0:2 0:3 0:4 0:5 0:6 0:7 0:8 0:9 0:10 0:11
striper translates LCU0's requests as follows using the remapped queues, and obtains the cells:

(Q:MCU)    0:0 0:1 1:0 1:1 2:0 2:1 3:0 3:1 4:0 4:1 5:0 5:1
These cells arrive at LCU0 looking like cells from Q0

(Q:MCU)    0:0 0:1 0:2 0:3 0:4 0:5 0:6 0:7 0:8 0:9 0:10 0:11

Hence, $LCU_0$ receives all cells from the queues of the actual MCUs as if there were a full set of MCUs in the system.

Figure 14:
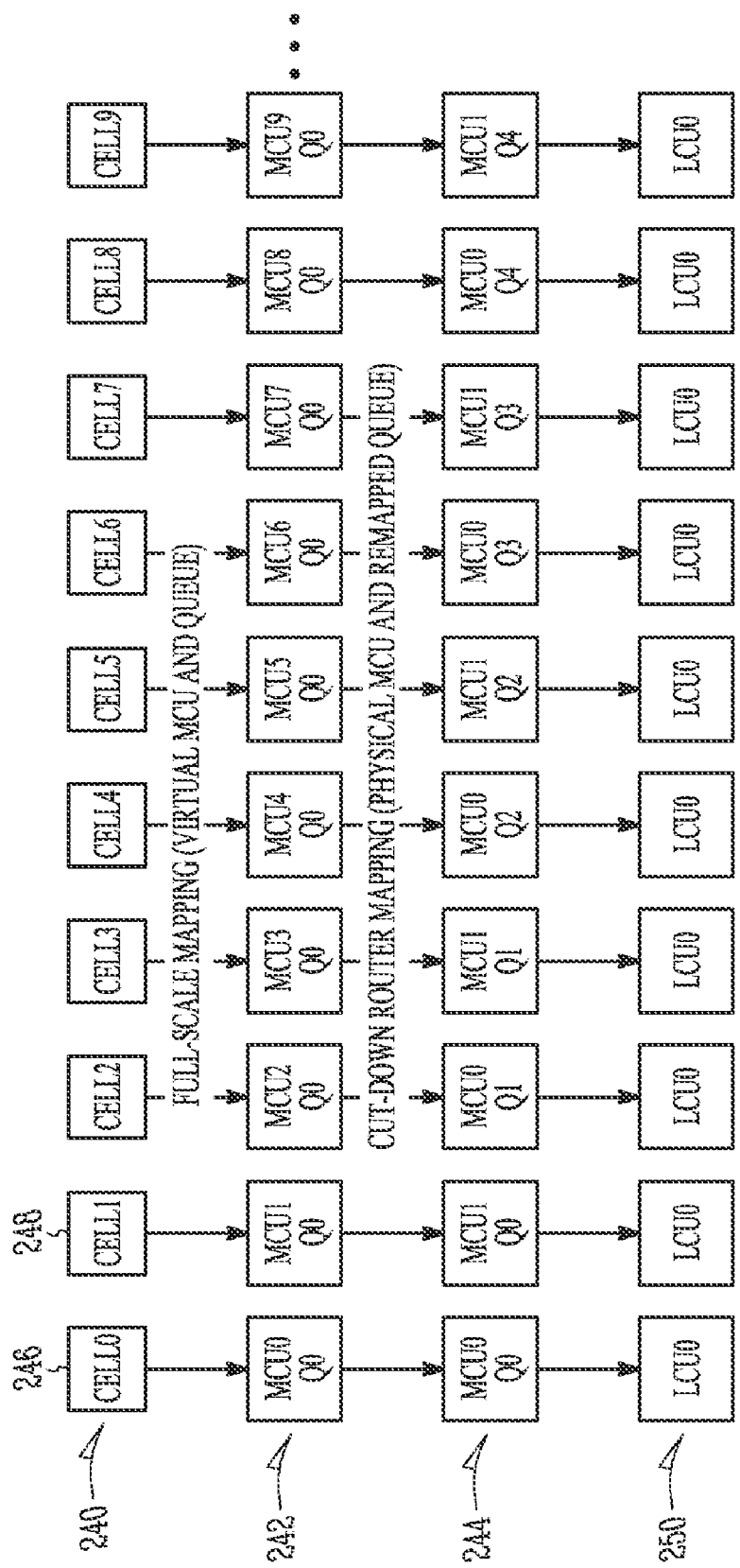
FIG. 14 illustrates an example of cell mapping for the cut-down router illustrated in FIG. 13.

FIG. 14 is a cell flow diagram illustrating the MCU remapping and queue remapping for the cut-down router illustrated in FIG. 13 and discussed with reference to Table 3. As with Table 3, for purposes of illustration it is assumed that the packet corresponding with cells 0-9 is destined for queue 0 (Q0), and the beginning of Q0 is at $MCU_0$. The top row 240 of blocks in FIG. 14 corresponds with cells 0 to 9. The cells are shown mapped to MCU's 0-9 respectively and Q0 as if in a full-scale router, which is represented by the second row 242 of blocks. In a full-scale router, cells 0-9 would be sent to MCU's 0-9 and to Q0. Being intended for Q0, all of the cells 0-9 are intended to go to $LCU_0$.

The cut-down remapping is shown in the third row 244 of blocks. The first column 246 of blocks shows the remapping of cell 0 from ($MCU_0$, Q0) to ($MCU_0$, Q0). The second column 248 of blocks shows the remapping of cell 1 from ($MCU_1$, Q0) to ($MCU_1$, Q0). In this example, Q0 is mapped to $LCU_0$ in the full-scale system, and there are two MCU's. Accordingly, the first two remappings are the same as the mapping in the full-scale system. As illustrated by the third block in the second row, cell 2 in a full-scale system is mapped to $MCU_2$ and Q0. In the cut-down router, $MCU_2$ does not exist. Accordingly, cell 2 must be mapped to a different MCU. The third block in row three shows the remapping of cell 2 from ($MCU_2$, Q0) to ($MCU_0$, Q1). In a cut-down router, to physically direct cell 2 to intended $LCU_0$, the output port associated with Q1 is mapped to $LCU_0$. In a full-scale router, the output port associated with Q1 might be mapped to $LCU_1$. The fourth block of the third row illustrates the remapping of cell 3 from ($MCU_3$, Q0) to ($MCU_1$, Q1). To physically direct cell 3 to intended $LCU_0$, the MCU, output port associated with Q1 is mapped to $LCU_0$. The remaining blocks in row three illustrate the cut-down remapping for cells 4-9. The fourth, bottom, row 250 of FIG. 14 illustrates the mapping of $MCU_0$-$MCU_1$ and Q0-Q4 to $LCU_0$ in the cut-down system. In a full-scale system, the cells would be destined for $MCU_0$-$MCU_9$, Q0, and $LCU_0$.

Figure 15:
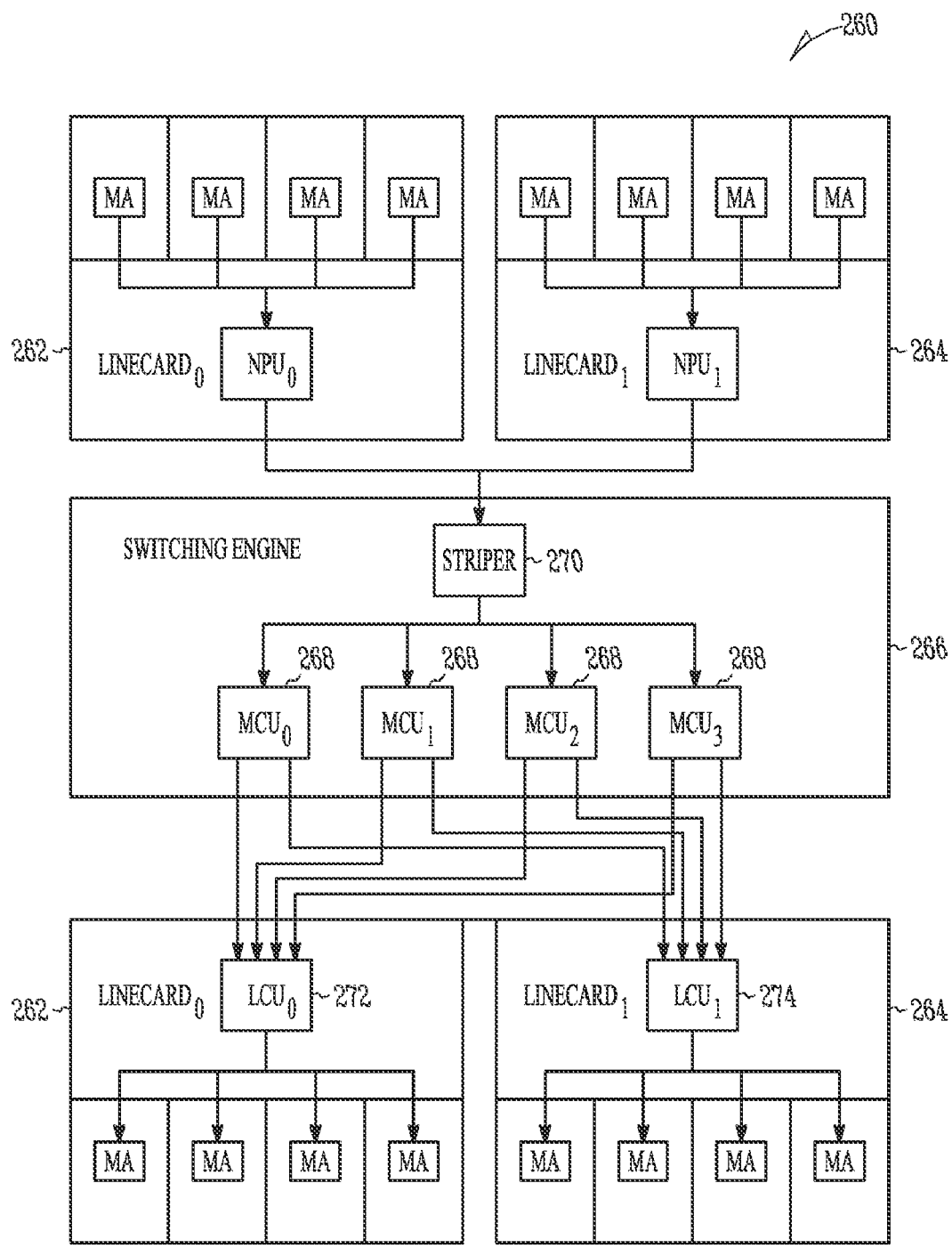
FIG. 15 illustrates a cut-down router comprising two NPUs, two LCUs, and one switching engine having 4 MCUs and one striper, in accordance with one embodiment of the present invention.

FIG. 15 illustrates a cut-down router 260 with two fully populated linecards 262, 264 and one switching engine 266 having four MCUs 268 to provide a cut-down router with a performance of about 80 Gbps. This cut-down router requires a switchcard or backplane which is different from the one in the full-scale router. The following table describes an example of how the cells of a packet are distributed by the striper 270 and received by the LCUs 272, 274. The packet may be destined for $LCU_0$ or $LCU_1$, and the example illustrated in Table 4 assumes the packet is destined for $LCU_1$.

cells 0-9 is destined for queue 1 (Q1), and the beginning of Q1 is at $MCU_0$. The top row 280 of blocks in FIG. 16 corresponds with cells 0 to 9. The cells are shown mapped to MCU's 0-9 respectively and Q1 as if in a full-scale router, which is represented by the second row 282 of blocks. In a full-scale router, cells 0-9 would be sent to MCU's 0-9 and to Q1. Being intended for Q1, all of the cells 0-9 are intended to go to $LCU_1$.

The cut-down remapping is shown in the third row 284 of blocks. The first column of blocks shows the remapping of cell 0 from ($MCU_0$, Q1) to ($MCU_0$, Q1). The second column of blocks shows the remapping of cell 1 from ($MCU_1$, Q1) to ($MCU_1$, Q1). The third column of blocks shows the remapping of cell 2 from ($MCU_2$, Q1) to ($MCU_2$, Q1). The fourth column of blocks shows the remapping of cell 3 from ($MCU_3$, Q1) to ($MCU_3$, Q1). In this example, Q1 is mapped to $LCU_1$ in the full-scale system, and there are four MCU's. Accordingly, the first four remappings are the same as the mapping in the full-scale system.

As illustrated by the fifth block in the second row, cell 4 in a full-scale system is mapped to $MCU_4$ and Q1. In the cut-down router, $MCU_4$ does not exist. Accordingly, cell 4 must be mapped to a different MCU. The fifth block in row three shows the remapping of cell 4 from ($MCU_4$, Q1) to ($MCU_0$, Q3). In a cut-down router, to physically direct cell 4 to intended $LCU_1$, the output port associated with Q3 is mapped to $LCU_1$. In a full-scale router, the output port associated with Q3 might be mapped to $LCU_3$. The sixth block of the third

TABLE 4

Example of cut-down system with two LCUs and four MCUs

Writing cells to switching memory in cut-down router:
Striper logically writes cells across MCUs as if in a full-scale system

| (Virtual MCU number): | 0 | 1 | 2 | 3 | 4 | 5 | 6 | 7 | 8 | 9 | 10 | 11 |
|---|---|---|---|---|---|---|---|---|---|---|---|---|

Physically, striper directs cells towards MCUs as follows:

| (Physical MCU number): | 0 | 1 | 2 | 3 | 0 | 1 | 2 | 3 | 0 | 1 | 2 | 3 |
|---|---|---|---|---|---|---|---|---|---|---|---|---|

And striper remaps the queues as follows based on the number of actual MCUs:

| (Queue number) | 1 | 1 | 1 | 1 | 3 | 3 | 3 | 3 | 5 | 5 | 5 | 5 |
|---|---|---|---|---|---|---|---|---|---|---|---|---|

From a connectivity perspective, MCU output ports (o) are coupled to LCU1 input ports (i) as follows:

| | | | | | | | | | | | | |
|---|---|---|---|---|---|---|---|---|---|---|---|---|
| $MCU0_o$:$LCU1_i$ (o:i) | 1:0 | | | 3:4 | | | 5:8 | | | | | |
| $MCU1_o$:$LCU1_i$ (o:i) | | 1:1 | | | 3:5 | | | 5:9 | | | | |
| $MCU2_o$:$LCU1_i$ (o:i) | | | 1:2 | | | 3:6 | | | 5:10 | | | |
| $MCU3_o$:$LCU1_i$ (o:i) | | | | 1:3 | | | 3:7 | | | 5:11 | | |

Requesting cells from switching memory in cut-down router:
LCU1 starts by requesting cells from Q1 as if across a full set of MCUs

| (Q:MCU) | 1:0 | 1:1 | 1:2 | 1:3 | 1:4 | 1:5 | 1:6 | 1:7 | 1:8 | 1:9 | 1:10 | 1:11 |
|---|---|---|---|---|---|---|---|---|---|---|---|---|

Striper translates LCU1's requests as follows using the remapped queues, and obtains the cells:

| (Q:MCU) | 1:0 | 1:1 | 1:2 | 1:3 | 3:0 | 3:1 | 3:2 | 3:3 | 5:0 | 5:1 | 5:2 | 5:3 |
|---|---|---|---|---|---|---|---|---|---|---|---|---|

These cells arrive at LCU1 looking like cells from Q1

| (Q:MCU) | 1:0 | 1:1 | 1:2 | 1:3 | 1:4 | 1:5 | 1:6 | 1:7 | 1:8 | 1:9 | 1:10 | 1:11 |
|---|---|---|---|---|---|---|---|---|---|---|---|---|

Hence, $LCU_1$ receives all cells from the queues of the actual MCUs as if there were a full set of MCUs in the system.

Figure 16:
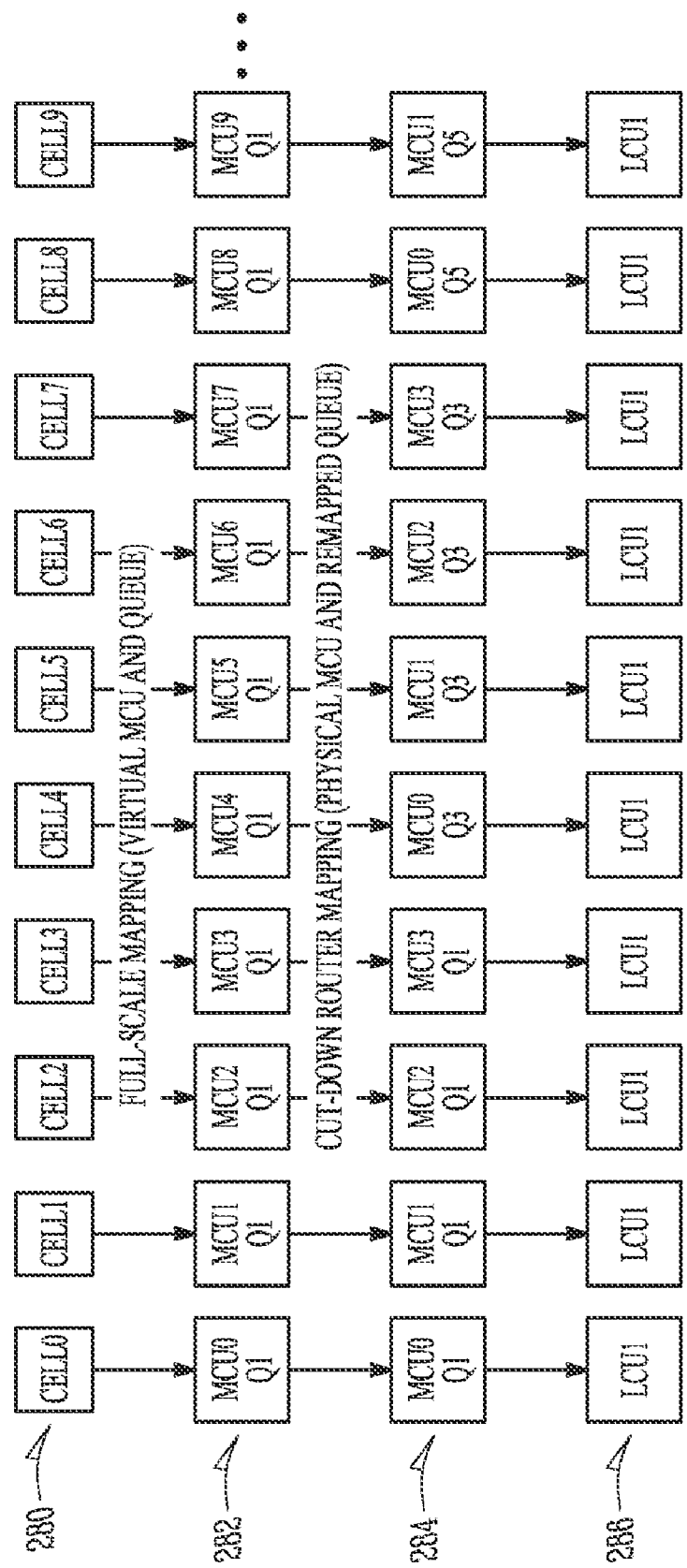
FIG. 16 illustrates an exemplary cell mappings for the cut-down router illustrated in FIG. 15, in accordance with one embodiment of the present invention.

FIG. 16 illustrates the MCU remapping and queue remapping for the cut-down router illustrated in FIG. 15 and discussed with reference to Table 4. As with Table 4, for purposes of illustration it is assumed that the packet corresponding with row illustrates the remapping of cell 5 from ($MCU_5$, Q1) to ($MCU_1$, Q3). To physically direct cell 5 to intended $LCU_1$, the $MCU_1$ output port associated with Q3 is mapped to $LCU_1$. The remaining blocks in row three illustrate the cut-down remapping of cells 7-9. The fourth, bottom, row 286 of FIG. 16 illustrates the mapping of $MCU_0$-$MCU_3$ and Q1, Q3, and Q5 to support the direction of cells all intended for Q1 and $LCU_1$ in a full-scale system to $LCU_1$ in the cut-down system.

Figure 18:
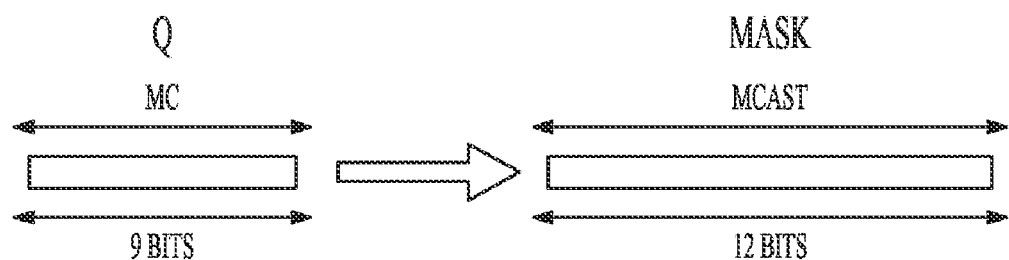
FIG. 18 illustrates an example of a queue number, in accordance with one embodiment of the present invention.

For multicast queues, the queue number is a 9 bit queue number which is an index to lookup a 12 bit multicast mask, which is structured differently than a unicast queue number. The 9 bit queue number ("$Q_{MC}$") encodes 512 multicast queues each of which is assigned to a 12 bit mask as in FIG. 18. The 12 bits in the multicast mask correspond to the 12 linecards that need to transmit the multicast packet or cell.

In a cut-down router, the modifications are made to the multicast mask rather than $Q_{MC}$. The multicast mask exists in both the striper and the MCUs, but not in the LCU. The multicast mask can be derived by a lookup, and a suitable queue number mapping. The programming of the lookup table provides the correct mapping in the multicast mask. Generally the approach is similar to that of unicast: the cells of a packet are striped across the virtual MCUs, and to transmit the cells properly to the physical LCUs, some transformations are required to address some cells to virtual LCUs. The following calculation is one method for modifying the multicast mask in a cut-down router according to the present invention.

$$\text{Mask}_{Mcast} \text{ seen by } MCU =$$
$$\text{Mask}_{Mcast} \text{ given by } NPU << \text{int}\left(\frac{\text{virtual } MCU \text{ number}}{N_{MCU}} * N_{LCU}\right)$$

The above described method for modifying the mask is best understood if each individual multicast queue is viewed as a related set of queues where the multicast mask is viewed as a part of the queue number encoded in unary. Unlike a unicast queue, which encodes the queue number in binary, the LCU portion of the multicast queue number can reference several LCU queues because it can set a separate bit for each one.

Each time the multicast mask is shifted, it indicates that the striper has cycled through all of the physical MCUs and it needs to transmit to the next set of virtual MCUs and virtual LCUs. Once the striper has cycled through all of the virtual MCUs, it needs to go back to using the original mask for the multicast queue.

In one example, the striper does not transmit its computations to the MCUs, as it does with the unicast case, which is addressed by remapping ($Q_{MC}$) the multicast queue number. The computed values of $Q_{MC}$ cause the MCUs to fetch the correct mask to store cells for virtual LCUs.

It is envisioned that various mapping functions for $Q_{MC}$ would work. In one example, the three high order bits of the 9 bit $Q_{MC}$, are reserved for use in this transformation. The three high order bits are set to int $$\left(\frac{\text{virtual } MCU \text{ number}}{N_{MCU}}\right)$$

This value never exceeds six so three bits suffice. To update the values of the three high order bits of $Q_{MC}$, multiples of $2^6$ are added to the current value of $Q_{MC}$.

As discussed earlier, the LCU does not realize that it is operating in a cut-down router, so the three high order bits of $Q_{MC}$ are cleared when transmitting a multicast cell to a LCU.

The masking of these bits is performed by the MCU when it is configured as being part of a cut-down router.

In an example of multicast mapping in a cut-down router, a multicast queue q has a mask with two bits set representing LCUs i and j. In a cut-down router, the cells coming out of the striper are sent to the physical MCUs with queue numbers:

q, q+$2^6$, q+$2*2^6$, q+$3*2^6$, ...

Similarly, the striper takes requests from LCU l to this queue and maps them into requests for queues: q, q+$2^6$, q+$2*2^6$, q+$3*2^6$, ...

More generally:

$$Q_{MC} = Q_{MC} + \text{int}\left(\frac{\text{virtual } MCU \text{ number}}{N_{MCU}}\right) * 2^6$$

The requests appear to come from the appropriate virtual LCU, as with the unicast case, so the striper again applies the function:

$$\text{virtual } LCU \text{ number} =$$
$$\text{int}\left(\frac{\text{virtual } MCU \text{ number}}{N_{MCU}}\right) * N_{LCU} + \text{physical } LCU \text{ number}$$

To continue the example, suppose mask {ij} represents a mask with bits for i and j set. Then the multicast queue q is configured as:

| | |
|---|---|
| Queue q | uses mask {ij} |
| Queue q + $2^6$ | uses mask {i + $N_{LCU}$j + $N_{LCU}$} or mask {ij} << $N_{LCU}$ |
| Queue q + $2 * 2^6$ | uses mask {i + 2 * $N_{LCU}$j + 2 * $N_{LCU}$} or mask {ij} << 2 * $N_{LCU}$ |
| Queue q + $3 * 2^6$ | uses mask {i + 3 * $N_{LCU}$j + 3 * $N_{LCU}$} or mask {ij} << 3 * $N_{LCU}$ |

An important aspect of this design choice is whether or not taking away three bits from the multicast queue number is affordable. In a full-scale router there are 12 linecards and $2^{12}$ possible combinations of LCUs are encoded in only $2^9$ queue numbers. Thus, the router is oversubscribed by a factor of $2^3$ per multicast queue. In a cut-down router with 6 linecards, $2^6$ combinations of LCUs are encoded in $2^6$ possible multicast queues, so the cut-down router is not oversubscribed. If the number of linecards is reduced further, then the number of possible combinations is decreased without decreasing the number of queues, so the cut-down router actually becomes undersubscribed. Thus, multicast in a cut-down router actually provides some advantages as compared with a full-scale router.

The following table illustrates one example of routing a multicast packet in a cut-down router having three LCUs ($LCU_0$, $LCU_1$, and $LCU_2$) and six MCUs. In this example, a packet arrives at the striper destined for multicast queue number 2, denoted by $Q_{MC}$=2, and queue 2 has a multicast mask of 0×6, or binary 000000000110, indicating LCUs 1 and 2.

TABLE 5

Example of routing a multicast packet in a cut-down router with three LCUs and six MCUs.

Striper logically writes cells across MCUs as if in a full-scale system

| (Virtual MCU number): | 0 | 1 | 2 | 3 | 4 | 5 | 6 | 7 | 8 | 9 | 10 | 11 |
|---|---|---|---|---|---|---|---|---|---|---|---|---|

Physically, striper directs cells towards MCUs as follows:

| (Physical MCU number): | 0 | 1 | 2 | 3 | 4 | 5 | 0 | 1 | 2 | 3 | 4 | 5 |
|---|---|---|---|---|---|---|---|---|---|---|---|---|

The queue number is transformed by adding 1 to the top three bits of the 9-bit multicast queue number. So, the transformed queue number is $2 + 2\hat{\,}6 = 66$, resulting in cells with $Q_{MC}$ number:

| (Queue number, multicast mask number in hex) | 2, 6 | 2, 6 | 2, 6 | 2, 6 | 2, 6 | 2, 6 | 66, 0x30 | 66, 0x30 | 66, 0x30 | 66, 0x30 | 66, 0x30 | 66, 0x30 |
|---|---|---|---|---|---|---|---|---|---|---|---|---|

A pair of delta notifications are sent by the striper to LCU 1 (via MCU 1) and LCU 2 (via MCU2) in the normal way, indicating the presence of this packet and giving its size and the original queue number. The LCUs are therefore aware of this packet and expect to find it on queue 2 and striped across all virtual MCUs.

LCU1 starts by requesting cells from queue 2 as if across a full set of MCUs

| (Physical LCU: Virtual MCU) | 1:0 | 1:1 | 1:2 | 1:3 | 1:4 | 1:5 | 1:6 | 1:7 | 1:8 | 1:9 | 1:10 | 1:11 |
|---|---|---|---|---|---|---|---|---|---|---|---|---|

LCU2 starts by requesting cells from queue 2 as if across a full set of MCUs

| (Physical LCU: Virtual MCU) | 2:0 | 2:1 | 2:2 | 2:3 | 2:4 | 2:5 | 2:6 | 2:7 | 2:8 | 2:9 | 2:10 | 2:11 |
|---|---|---|---|---|---|---|---|---|---|---|---|---| striper translates the queue number in each request to:

| (queue: translated queue) | 2:2 | 2:2 | 2:2 | 2:2 | 2:2 | 2:2 | 2:66 | 2:66 | 2:66 | 2:66 | 2:66 | 2:66 |
|---|---|---|---|---|---|---|---|---|---|---|---|---| striper transforms physical LCU number to virtual LCU numbers:

| (from LCU1) | 1 | 1 | 1 | 1 | 1 | 1 | 4 | 4 | 4 | 4 | 4 | 4 |
|---|---|---|---|---|---|---|---|---|---|---|---|---|
| (from LCU2) | 2 | 2 | 2 | 2 | 2 | 2 | 5 | 5 | 5 | 5 | 5 | 5 |

In summary: the MCUs see the following requests:

| (Queue: physical LCU: virtual MCU) from LCU 1 | 2:1:0 | 2:1:1 | 2:1:2 | 2:1:3 | 2:1:4 | 2:1:5 | 66:4:0 | 66:4:1 | 66:4:2 | 66:4:3 | 66:4:4 | 66:4:5 |
|---|---|---|---|---|---|---|---|---|---|---|---|---|
| (Queue: physical LCU: virtual MCU) to LCU 2 | 2:2:0 | 2:2:1 | 2:2:2 | 2:2:3 | 2:2:4 | 2:2:5 | 66:5:0 | 66:5:1 | 66:5:2 | 66:5:3 | 66:5:4 | 66:5:5 |

MCU masks the top 3-bits of the multicast queue number $Q_{MC}$. These cells arrive at the LCUs looking like cells with (queue: physical LCU: virtual MCU) values.

| (Queue: physical LCU: virtual MCU) from LCU 1 | 2:1:0 | 2:1:1 | 2:1:2 | 2:1:3 | 2:1:4 | 2:1:5 | 2:1:6 | 2:1:7 | 2:1:8 | 2:1:9 | 2:1:10 | 2:1:11 |
|---|---|---|---|---|---|---|---|---|---|---|---|---|
| (Queue: virtual LCU: physical MCU) from LCU 2 | 2:2:0 | 2:2:1 | 2:2:2 | 2:2:3 | 2:2:4 | 2:2:5 | 2:2:6 | 2:2:7 | 2:2:8 | 2:2:9 | 2:2:10 | 2:2:11 |

All cells appear to be from queue $Q_{MC} = 2$ in the right order

The invention disclosed herein has been described in detail with reference to various embodiments thereof, with some aspects of the invention being described in the accompanying drawings. Numerous specific details are set forth in order to provide a thorough understanding of the present invention. However, it will be apparent to those skilled in the art that the present invention may be practiced without some or all of the specific details, that operations may be rearranged, combined, and subdivided, that some operations may be eliminated or performed in a different way, and that other changes may be made without departing from the spirit and scope of the present invention. Accordingly, unless specifically indicated herein, the particular components and arrangement of components, and the order and grouping of the operations are not generally intended to be a limitation of the present invention.

We claim:

1. A method for storing a packet in a memory of a router, comprising:
   based on a destination address of the packet, assigning the packet to at least one outgoing link of the router;
   assigning to the packet a destination queue associated with the at least one outgoing link of the router, assigning of the destination queue being based on a full-scale configuration in which the router has one or more switchcards, each switchcard having two or more memory control units;
   determining if the router is implemented in a scaled-down configuration in which, on at least one of the one or more switchcards, a reduced number of memory control units are available relative to the full-scale configuration, and determining the number of memory control units which are available in the scaled-down configuration; and
   storing the packet in at least one remapped destination queue in the memory based in part on the assigned outgoing link and on the determined number of memory control units.

2. The method of claim 1, wherein the destination queue is mapped to the at least one assigned outgoing link prior to storing the packet.

3. The method of claim 1 wherein the determining operation further includes assigning a queue offset number.

4. The method of claim 3, wherein the at least one remapped destination queue includes, as a function of the queue offset number, at least one destination queue additional to the assigned destination queue.

5. The method of claim 4, wherein the storing operation includes dividing the packet into at least two cells.

6. The method of claim 5, further comprising writing the at least two cells from a striper to the remapped destination queues in a parallel arrangement.

7. The method of claim 4, wherein the storing operation writes the at least two cells in the at least one additional destination queue.

8. The method of claim 7, wherein the storing operation writes the at least two cells in the at least one remapped destination queue contiguously in round robin order.

9. The method of claim 1, wherein the determining if the router is implemented in a scaled-down configuration includes determining how many line cards, switch cards, and memory control units are available.

10. The method of claim 1,
further comprising remapping to the packet to the at least one remapped destination queue based on a number of memory control units and line card units available.

11. A method of routing and switching a packet from an incoming link to an outgoing link of a router, the method comprising:
assigning a destination queue to the packet prior to storing the packet for switching, assigning of the destination queue being based on a full-scale configuration in which the router has one or more switchcards, each switchcard having two or more memory control units;
determining if the router is implemented in a scaled-down configuration in which, on at least one of the one or more switchcards, a reduced number of memory control units are available relative to the full-scale configuration, and determining the number of memory control units which are available in the scaled-down configuration
based on the determining, remapping the destination queue to one or more remapped destination queues; and
storing the packet in the one or more remapped destination queues.

12. The method of claim 11, further comprising:
requesting a packet from the destination queue;
translating the request to the one or more remapped destination queues; and
transmitting the packet from the one or more remapped destination queues.

13. A router comprising:
memory including a plurality of memory control units to store packets, the memory having a full-scale configuration comprising one or more switchcards, each switchcard having two or more memory control units; and
at least one processor configured to:
assign the packet to at least one outgoing link of the router based on a destination address of the packet;
assign to the packet a destination queue associated with the at least one outgoing link of the router, assigning of the destination queue being based on the full-scale configuration;
determine if the router is implemented in a scaled-down configuration in which, on at least one of the one or more switchcards, a reduced number of memory control units are available relative to the full-scale configuration, and determine the number of memory control units which are available in the scaled-down configuration; and
store the packet in at least one remapped destination queue in the memory based in part on the assigned outgoing link and on the determined number of memory control units.

14. The router of claim 13, wherein the destination queue is mapped to the assigned outgoing link prior to storage of the packet for switching.

15. The router of claim 13, wherein the at least one remapped destination queue includes, based on an assigned queue offset number, at least one destination queue additional to the assigned destination queue.

16. The router of claim 13, wherein the processor is configured to
remap to the packet to the at least one remapped destination queue based on the determined number of memory control units and line card units available.

* * * * *

UNITED STATES PATENT AND TRADEMARK OFFICE
CERTIFICATE OF CORRECTION

| | | |
|---|---|---|
| PATENT NO. | : 7,710,991 B1 | Page 1 of 1 |
| APPLICATION NO. | : 10/414135 | |
| DATED | : May 4, 2010 | |
| INVENTOR(S) | : Anthony J. Li et al. | |

It is certified that error appears in the above-identified patent and that said Letters Patent is hereby corrected as shown below:

In column 29, line 15, in Claim 10, after "remapping" delete "to".

In column 29, line 31, in Claim 11, after "configuration" insert -- ; --.

In column 30, line 35, in Claim 16, after "remap" delete "to".

Signed and Sealed this

Twentieth Day of July, 2010

David J. Kappos
*Director of the United States Patent and Trademark Office*